(12) United States Patent
Johnson et al.

(10) Patent No.: US 8,965,642 B2
(45) Date of Patent: Feb. 24, 2015

(54) DISPLAY SYSTEM OF EXCAVATING MACHINE AND EXCAVATING MACHINE

(71) Applicant: Komatsu Ltd., Minato-ku, Tokyo (JP)

(72) Inventors: Neil Johnson, Sahuarita, AZ (US);
Takahiro Hashimoto, Hiratsuka (JP);
Takashi Kurihara, Hiratsuka (JP);
Azumi Nomura, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 89 days.

(21) Appl. No.: 13/845,675

(22) Filed: Mar. 18, 2013

(65) Prior Publication Data

US 2014/0100744 A1 Apr. 10, 2014

Related U.S. Application Data

(60) Provisional application No. 61/710,530, filed on Oct. 5, 2012.

(51) Int. Cl.
| | |
|---|---|
| *G06F 19/00* | (2011.01) |
| *E02F 9/26* | (2006.01) |
| *E02F 3/32* | (2006.01) |
| *E02F 3/36* | (2006.01) |

(52) U.S. Cl.
CPC . *E02F 9/264* (2013.01); *E02F 3/32* (2013.01); *E02F 3/3677* (2013.01); *E02F 9/261* (2013.01)
USPC .......................................................... 701/50

(58) Field of Classification Search
None
See application file for complete search history.

(56) References Cited

U.S. PATENT DOCUMENTS

| 7,532,967 B2 * | 5/2009 | Fujishima et al. ............... 701/50 |
| 2006/0026101 A1 | 2/2006 | Ogura et al. |
| 2014/0099178 A1 * | 4/2014 | Nomura et al. ............... 414/685 |
| 2014/0100712 A1 * | 4/2014 | Nomura et al. .................... 701/1 |
| 2014/0142817 A1 * | 5/2014 | Matsuyama .................... 701/50 |

FOREIGN PATENT DOCUMENTS

| JP | 2003-056010 A | 2/2003 |
| JP | 2005-11058 A | 1/2005 |
| JP | 2006-214246 A | 8/2006 |
| JP | 2012-172431 A | 9/2012 |

* cited by examiner

*Primary Examiner* — Helal A Algahaim
*Assistant Examiner* — Kelly E Darby
(74) *Attorney, Agent, or Firm* — Global IP Counselors, LLP

(57) ABSTRACT

A display system of an excavating machine including a work machine having a bucket with an excavation edge and an arm to which the bucket is swingably attached, and a body to which the work machine is attached, the system including: a vehicle condition detector detecting first information related to a current position of the excavating machine and second information related to a posture of the body; a storage storing position information of a target surface indicating a target shape of an object and appearance information of the bucket; and a processor obtaining virtual images indicating positions of planes passing through both ends of the excavation edge from among planes parallel to a plane on which the arm moves based on the first and second information, and the appearance information, and displaying the virtual images on a screen with the bucket as viewed from above the excavating machine.

8 Claims, 18 Drawing Sheets

| REGISTRATION IDENTIFICATION CODE | TYPE IDENTIFICATION CODE | SIZE A | SIZE B | SIZE C | SIZE D | SIZE E |
|---|---|---|---|---|---|---|
| 1 | 1 | 123 | 456 | 30 | 789 | |
| 2 | 1 | 321 | 654 | 20 | 987 | |
| ⋮ | ⋮ | ⋮ | ⋮ | ⋮ | ⋮ | |
| 5 | 2 | 234 | 567 | 40 | 891 | 50 |

1: STANDARD BUCKET
2: TILT BUCKET

DISPLAY SYSTEM OF EXCAVATING MACHINE AND EXCAVATING MACHINE

BACKGROUND OF THE INVENTION

1. Field of the Invention

The present invention relates to a display system of an excavating machine and an excavating machine provided with the same.

2. Description of the Related Art

Typically, an excavating machine such as an excavator is operated by an operator who is a manipulator with an operating lever, so that a work machine including a bucket is driven, and excavates the ground and the like that is an object to be worked. For example, Patent Literature 1 discloses a technology in which a blade edge position of a bucket is detected, relation between an absolute position of a buried pipe and an absolute position of the blade edge of the bucket is determined, and an excavation position and an excavation depth by the bucket is determined by an excavation position/depth determination means based on the relation.

When the ground that is an object to be worked is excavated according to a target surface using an excavating machine such as an excavator, where the target surface is a part of a design surface of an object to be constructed, an operator of the excavating machine especially requires relative position information between the target surface and a blade edge of a bucket (excavation edge portion). The technology of Japanese Patent Application Laid-Open Publication No. 2003-056010 is capable of grasping the position of the blade edge of the bucket (excavation edge portion) in a side view. However, if the technology of Japanese Patent Application Laid-Open Publication No. 2003-056010 is used, during groove excavation using the excavating machine such as an excavator, the operator needs to presume the relative position information between the blade edge of the bucket (excavation edge portion) and a wall surface of the groove only with the position of the blade edge of the bucket (excavation edge portion) in a side view that can be grasped. Therefore, the technology of Japanese Patent Application Laid-Open Publication No. 2003-056010 may not provide a right and left status of a bucket in a width direction in an easy-to-understand manner.

SUMMARY OF THE INVENTION

A display system of an excavating machine, the excavating machine comprising a work machine including a bucket generating an excavating force at an excavation edge portion and an arm to which the bucket is swingably attached, and a body unit to which the work machine is attached, the display system comprises: a vehicle condition detection unit configured to detect information related to a current position of the excavating machine and information related to a posture of the body unit; a storage unit configured to store position information of a target surface indicating a target shape of an object to be worked and appearance information of the bucket; and a processor configured to obtain virtual images indicating positions of planes passing through both ends of the excavation edge portion from among planes parallel to a plane on which the arm moves based on the information related to the current position of the excavating machine, the information related to the posture of the body unit, and the appearance information of the bucket, and to display the virtual images on a screen of a display device with the bucket as viewed from above the excavating machine.

DETAILED DESCRIPTION OF THE PREFERRED EMBODIMENTS

An embodiment for implementing the present invention (embodiment) will be described in detail with reference to the drawings. The present invention is not limited by a content described in the embodiment below. Also, in the embodiment below, an excavator will be described as an example of an excavating machine. However, the excavating machine is not limited to the excavator as long as one has a function to excavate or fill in an object.

An object of the embodiment is to provide an operator of an excavating machine with a right and left status of a bucket in a width direction in an easy-to-understand manner when the operator carries out works of groove excavation according to a design surface.

The embodiment can provide an operator of an excavating machine with a right and left status of a bucket in a width direction in an easy-to-understand manner when the operator carries out works of groove excavation according to a design surface.

<An Overall Configuration of an Excavating Machine>

Figure 1:
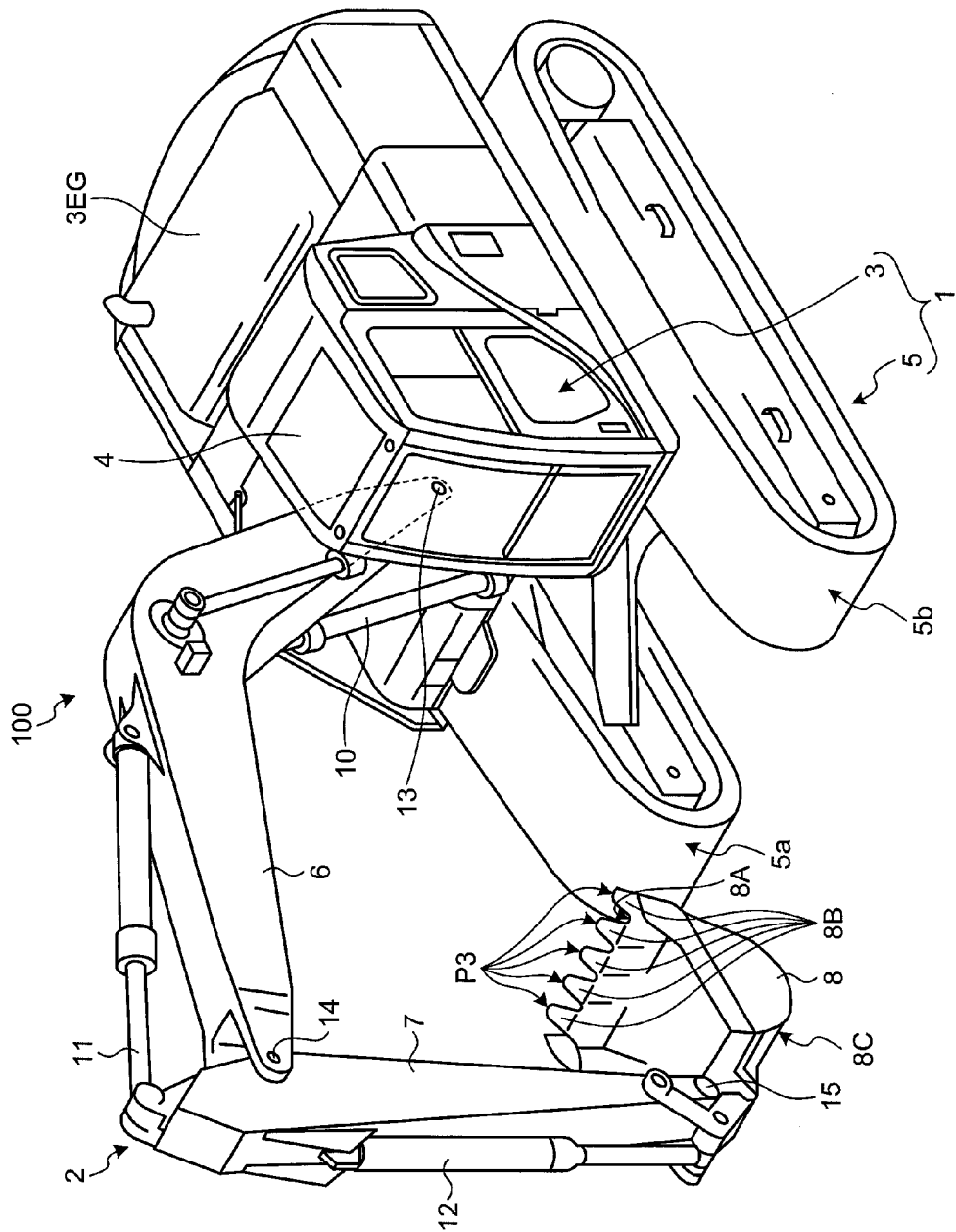
FIG. 1 is a perspective view of an excavator 100 according to a present embodiment.
Figure 2:
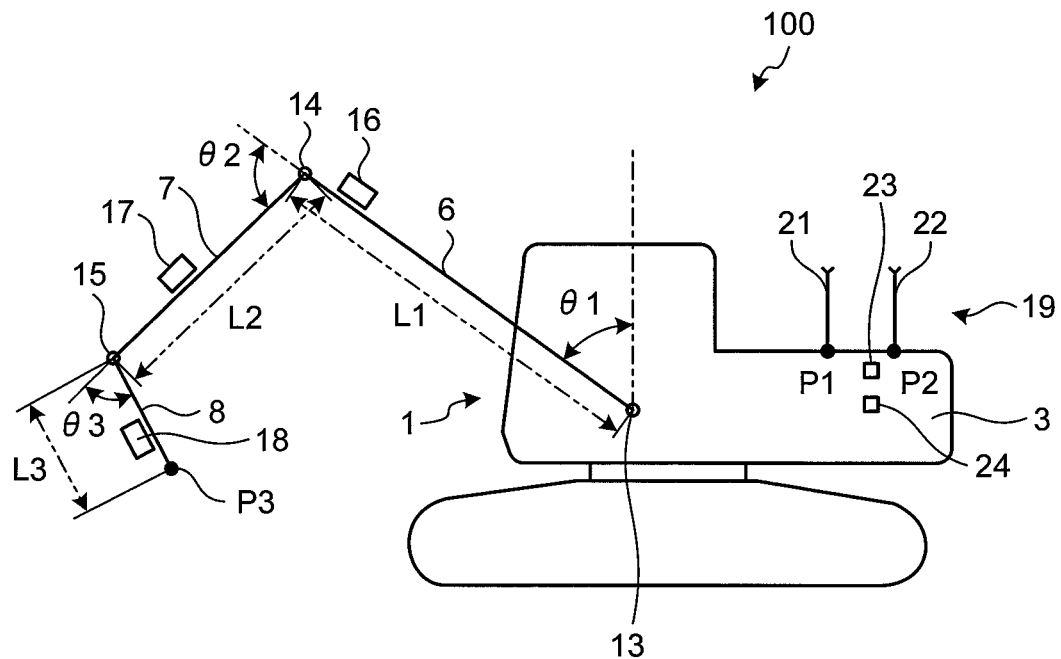
FIG. 2 is a side view of the excavator 100.
Figure 3:
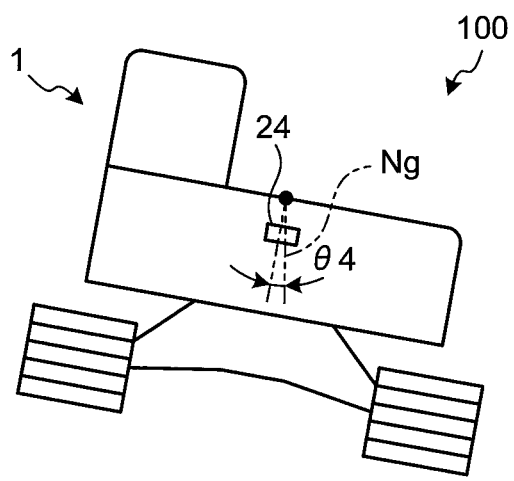
FIG. 3 is a rear view of the excavator 100.
Figure 4:
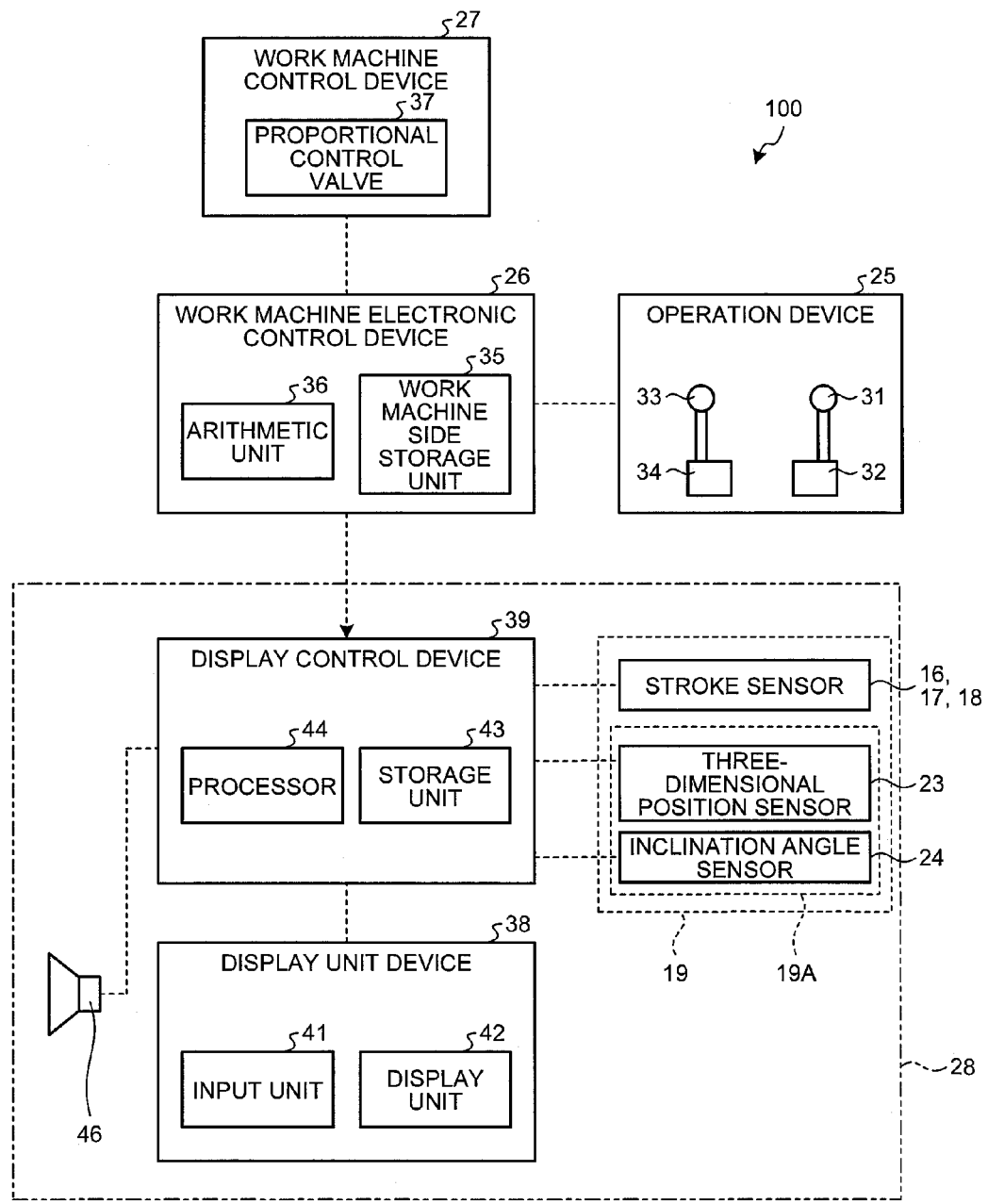
FIG. 4 is a block diagram illustrating a control system included in the excavator 100.
Figure 5:
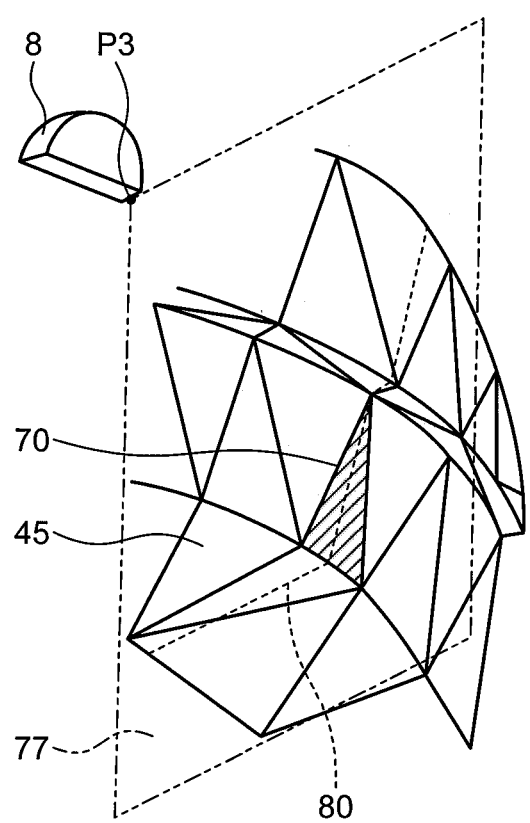
FIG. 5 is a diagram illustrating design topography indicated by design topographic data.

FIG. 1 is a perspective view of an excavator 100 according to the present embodiment. FIG. 2 is a side view of the excavator 100. FIG. 3 is a rear view of the excavator 100. FIG. 4 is a block diagram illustrating a control system included in the excavator 100. FIG. 5 is a diagram illustrating design topography indicated by design topographic data. In the present embodiment, the excavator 100 as an excavating machine includes a vehicle body 1 as a body unit and a work machine 2. The vehicle body 1 includes an upper swing body 3 and a travelling device 5. The upper swing body 3 accommodates devices such as a power generation device and a hydraulic pump (not illustrated) inside an engine room 3EG. The engine room 3EG is arranged on one end side of the upper swing body 3.

The excavator 100 in the present embodiment has an internal-combustion engine such as a diesel engine as the power generation device. However, the excavator 100 is not limited to this example. The excavator 100 may include a hybrid-system power generation device, which is a combination of an internal-combustion engine, a generator motor, and an electric storage device.

The upper swing body 3 includes an operator cab 4. The operator cab 4 is placed on the other end side of the upper swing body 3. That is, the operator cab 4 is arranged at a side opposite to the engine room 3EG. In the operator cab 4, a display input device 38 and an operation device 25 illustrated in FIG. 4 are arranged. These devices will be described below. The travelling device 5 includes caterpillar bands 5a and 5b. The travelling device 5 travels by rotation of the caterpillar bands 5a and 5b, and causes the excavator 100 to travel. The work machine 2 is attached to the upper swing body 3 at the side of the operator cab 4.

In the upper swing body 3, the side where the work machine 2 and the operator cab 4 are arranged represents a front side, and the side where the engine room 3EG is arranged represents a rear side. Facing front, the left side represents a left side in the upper swing body 3, and the right side represents a right side in the upper swing body 3. Also, in the excavator 100 and the vehicle body 1, the side of the travelling device 5 based on the upper swing body 3 represents a lower side, and the side of the upper swing body 3 based on the travelling device 5 represents an upper side. In a case where the excavator 100 is arranged on a horizontal plane, the lower side is in the vertical direction, that is, in the direction of action of gravity, and the upper side is in an opposite direction to the vertical direction.

The work machine 2 includes a boom 6, and an arm 7, a bucket 8, a boom cylinder 10, an arm cylinder 11, and a bucket cylinder 12. A base end portion of the boom 6 is swingably attached to a front portion of the vehicle body 1 via a boom pin 13. A base end portion of the arm 7 is swingably attached to a tip portion of the boom 6 via an arm pin 14. The bucket 8 is swingably attached to a tip portion of the arm 7 via a bucket pin 15. A blade (tooth member) 8B is attached to an edge portion 8A of a concave portion of the bucket 8. A tip of the blade 8B is an excavation edge portion P3 in which the work machine 2 generates excavating force. The bucket 8 may not have the blade 8B in the edge portion 8A of the concave portion depending on a type of the bucket 8, and in such a case, the edge portion 8A of the concave portion of the bucket 8 serves as the excavation edge portion P3 in which the excavating force is generated. Further, a base portion of the concave portion of the bucket 8 is referred to as a bottom portion 8C, and the work machine 2 can level the ground by pressing the bottom portion 8C against a surface of the ground.

As illustrated in FIG. 2, the length of the boom 6, that is, the length from the boom pin 13 to the arm pin 14 is L1. The length of the arm 7, that is, the length from a center of the arm pin 14 to a center of the bucket pin 15 is L2. The length of the bucket 8, that is, the length from the center of the bucket pin 15 to the excavation edge portion P3 of the bucket 8 is L3.

The boom cylinder 10, the arm cylinder 11, and the bucket cylinder 12 illustrated in FIG. 1 are hydraulic cylinders respectively driven by pressure of hydraulic oil (hereinafter, properly referred to as hydraulic pressure). The boom cylinder 10 drives the boom 6 and causes the boom 6 to ascend and descend. The arm cylinder 11 drives the arm 7 and causes a vicinity of the arm pin 14 to swing. The bucket cylinder 12 drives the bucket 8 and causes a vicinity of the bucket pin 15 to swing. A proportional control valve 37 illustrated in FIG. 4 is arranged between the hydraulic cylinders of the boom cylinder 10, the arm cylinder 11, and the bucket cylinder 12, and a hydraulic pump (not illustrated). A work machine electronic control device 26 described below controls the proportional control valve 37, so that flow rates of the hydraulic oil supplied to the boom cylinder 10, the arm cylinder 11, and the bucket cylinder 12 are controlled. As a result, operations of the boom cylinder 10, the arm cylinder 11, and the bucket cylinder 12 are controlled.

As illustrated in FIG. 2, the boom 6, the arm 7, and the bucket 8 are respectively provided with a first stroke sensor 16, a second stroke sensor 17, and a third stroke sensor 18. The first stroke sensor 16 detects a stroke length of the boom cylinder 10. A display control device 39 (see FIG. 4) described below calculates an inclination angle θ1 of the boom 6 with respect to a Za axis in a vehicle body coordinate system described below from the stroke length of the boom cylinder 10 detected by the first stroke sensor 16. The second stroke sensor 17 detects a stroke length of the arm cylinder 11. The display control device 39 calculates an inclination angle θ2 of the arm 7 with respect to the boom 6 from the stroke length of the arm cylinder 11 detected by the second stroke sensor 17. The third stroke sensor 18 detects a stroke length of the bucket cylinder 12. The display control device 39 calculates an inclination angle θ3 of the bucket 8 with respect to the arm 7 from the stroke length of the bucket cylinder 12 detected by the third stroke sensor 18.

The vehicle body 1 is provided with a work machine condition detection unit 19. The work machine condition detection unit 19 detects a current position of the excavator 100, a posture of the vehicle body 1, and a current position of the excavation edge portion P3. The work machine condition detection unit 19 includes two antennas 21 and 22 (hereinafter, properly referred to as GNSS antennas 21 and 22) used for a real time kinematic-global navigation satellite systems (RTK-GNSS, GNSS means global navigation satellite system), a three-dimensional position sensor 23, and an inclination angle sensor 24. The GNSS antennas 21 and 22 are disposed on the vehicle body 1, to be more specific, on the upper swing body 3. In the present embodiment, the GNSS antennas 21 and 22 are disposed away from each other by a certain distance along a Ya axis in the vehicle body coordinate system described below. The GNSS antennas 21 and 22 may be away from each other by a certain distance along an Xa axis in the vehicle body coordinate system, or may be away from each other by a certain distance within an Xa-Ya axes surface in the vehicle body coordinate system. In the present embodiment, a vehicle condition detection unit 19A includes the three-dimensional position sensor 23 and the inclination angle sensor 24, and for example, can detects information related to a posture of the vehicle body 1 such as the vehicle body coordinate system described below.

A signal according to a GNSS radio wave received by the GNSS antennas 21 and 22 is input to the three-dimensional position sensor 23. The three-dimensional position sensor 23 detects locations P1 and P2 of the GNSS antennas 21 and 22. As illustrated in FIG. 3, the inclination angle sensor 24 detects an inclination angle θ4 (hereinafter, properly referred to as a roll angle θ4) in a width direction of the vehicle body 1 with respect to the direction of action of gravity, that is, in a vertical direction Ng. Note that, in the present embodiment, the width direction means a width direction of the bucket 8, and accords with a width direction of the upper swing body 3, that is, a right and left direction. However, in a case where the work machine 2 is provided with a tilt bucket described below, the width direction of the bucket and the width direction of the upper swing body 3 may not accord with each other.

The excavator 100 is provided with the operation device 25, the work machine electronic control device 26, a work machine control device 27, and a display system (hereinafter, properly referred to as a display system) 28 of the excavating machine. The operation device 25 includes a work machine operation member 31, a work machine operation detection unit 32, a travel operation member 33, and a travel operation detection unit 34. The work machine operation member 31 is a member used for operating the work machine 2 by an operator, and is, for example, a joy stick or an operating lever. The work machine operation detection unit 32 detects an operation content of the work machine operation member 31 and transmits the operation content as a detection signal to the work machine electronic control device 26. The travel operation member 33 is a member used for operating travelling of the excavator 100 by the operator, and is, for example, a joy stick or an operating lever. The travel operation detection unit 34 detects an operation content of the travel operation member 33 and transmits the operation content as a detection signal to the work machine electronic control device 26.

The work machine electronic control device 26 includes a work machine side storage unit 35 that includes at least one of random access memory (RAM) and read only memory (ROM) and an arithmetic unit 36 such as a central processing unit (CPU). The work machine electronic control device 26 mainly controls the work machine 2. The work machine electronic control device 26 generates a control signal for causing the work machine 2 to operate in accordance with an operation of the work machine operation member 31 and outputs the signal to the work machine control device 27. The work machine control device 27 includes the proportional control valve 37, and the proportional control valve 37 is controlled based on a control signal from the work machine electronic control device 26. The hydraulic oil at a flow rate in accordance with the control signal from the work machine electronic control device 26 flows out of the proportional control valve 37 and is supplied to at least one of the boom cylinder 10, the arm cylinder 11, and the bucket cylinder 12. Then, the boom cylinder 10, the arm cylinder 11, and the bucket cylinder 12 illustrated in FIG. 1 is driven in accordance with the hydraulic oil supplied from the proportional control valve 37. As a result, the work machine 2 operates.

<Display System 28>

The display system 28 is a system for providing the operator with information for excavating the ground in a work area to form the ground into a shape like a design surface described below. The display system 28 includes the display input device 38 as a display device, the display control device 39, a sound generation device 46 that includes a speaker and the like for providing a warning tone besides the first stroke sensor 16, the second stroke sensor 17, the third stroke sensor 18, the three-dimensional position sensor 23, and the inclination angle sensor 24 described above.

The display input device 38 includes a touch panel type input unit 41 and a display unit 42 such as a liquid crystal display (LCD). The display input device 38 displays a guide screen for providing information for performing excavation. Further, the guide screen displays various types of keys. The operator as a manipulator (or a service engineer when he inspects or fixes the excavator 100) can execute various types of functions of the display system 28 by touching the various types of keys on the guide screen. The guide screen will be described in detail below.

The display control device 39 executes the various types of functions of the display system 28. The display control device 39 is an electronic control device that includes a storage unit 43 including at least one of RAM and ROM and a processor 44 such as a CPU. The storage unit 43 stores work machine data. The work machine data includes the length L1 of the boom 6, the length L2 of the arm 7, and the length L3 of the bucket 8 described above. Also, the work machine data includes a minimum value and a maximum value of each of the inclination angle θ1 of the boom 6, the inclination angle θ2 of the arm 7, and the inclination angle θ3 of the bucket 8.

The display control device 39 and the work machine electronic control device 26 are communicatable to each other via a wireless or wired communication means. The storage unit 43 of the display control device 39 stores design topographic data created in advance. The design topographic data is information related to a shape and a position of three-dimensional design topography. The design topography indicates a target shape of the ground that is an object to be worked. The display control device 39 causes the display input device 38 to display the guide screen based on the design topographic data and information such as a detection result from the various types of sensors described above. To be specific, as illustrated in FIG. 5, the design topography is made up of a plurality of design surfaces 45 that are respectively expressed by triangle polygons. Note that, in FIG. 5, one of the plurality of design surfaces is denoted with the reference sign 45, and the reference signs of the other design surfaces are omitted. The target object to be worked is one design surface or a plurality of design surfaces from among these design surfaces 45. The operator selects one design surface or a plurality of design surfaces from among these design surfaces 45 as a target surface 70. The target surface 70 is a surface to be excavated among the plurality of design surfaces 45. The display control device 39 causes the display input device 38 to display the guide screen for informing the operator of a position of the target surface 70.

<Guide Screen>

Figure 6:
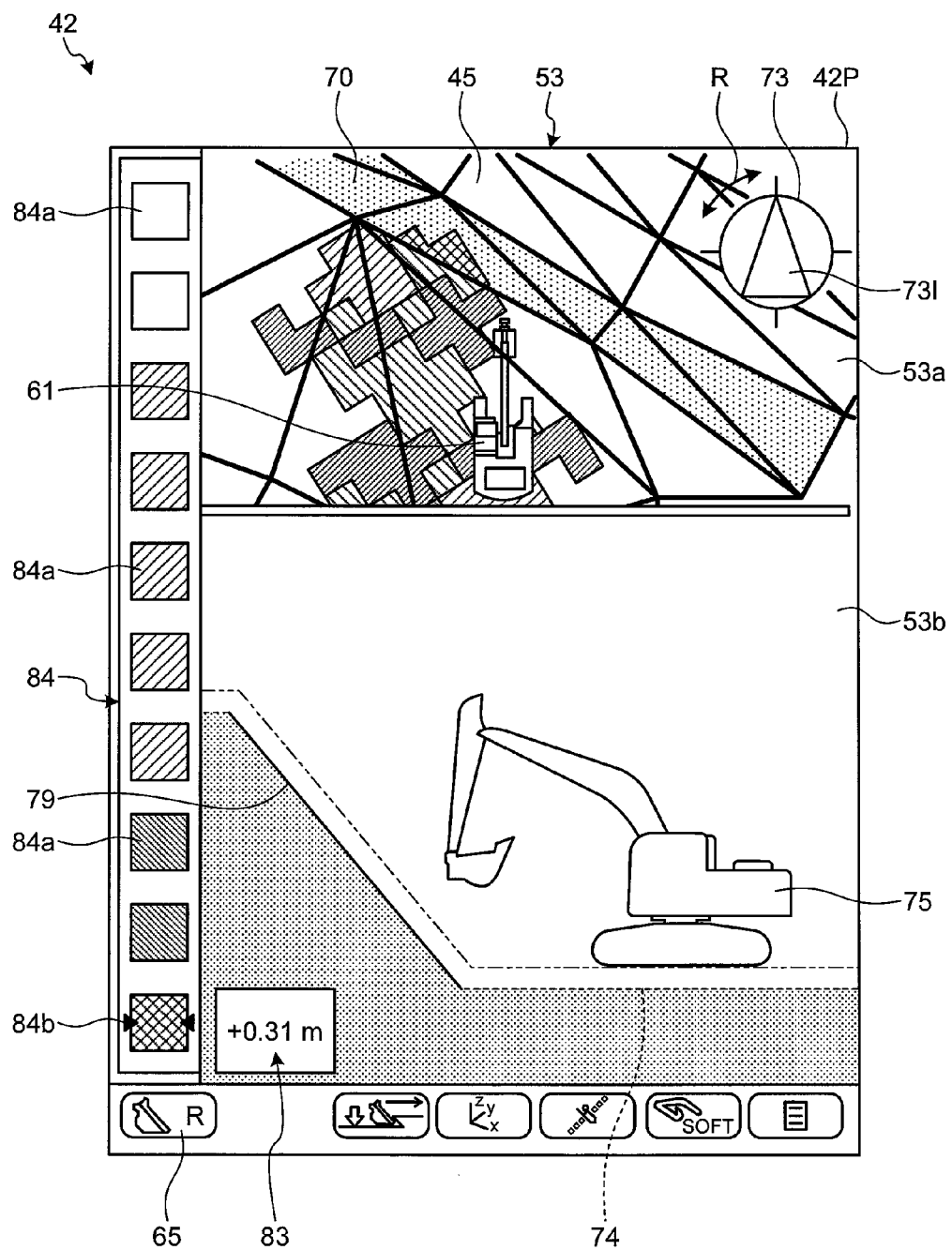
FIG. 6 is a diagram illustrating an example of a guide screen.
Figure 7:
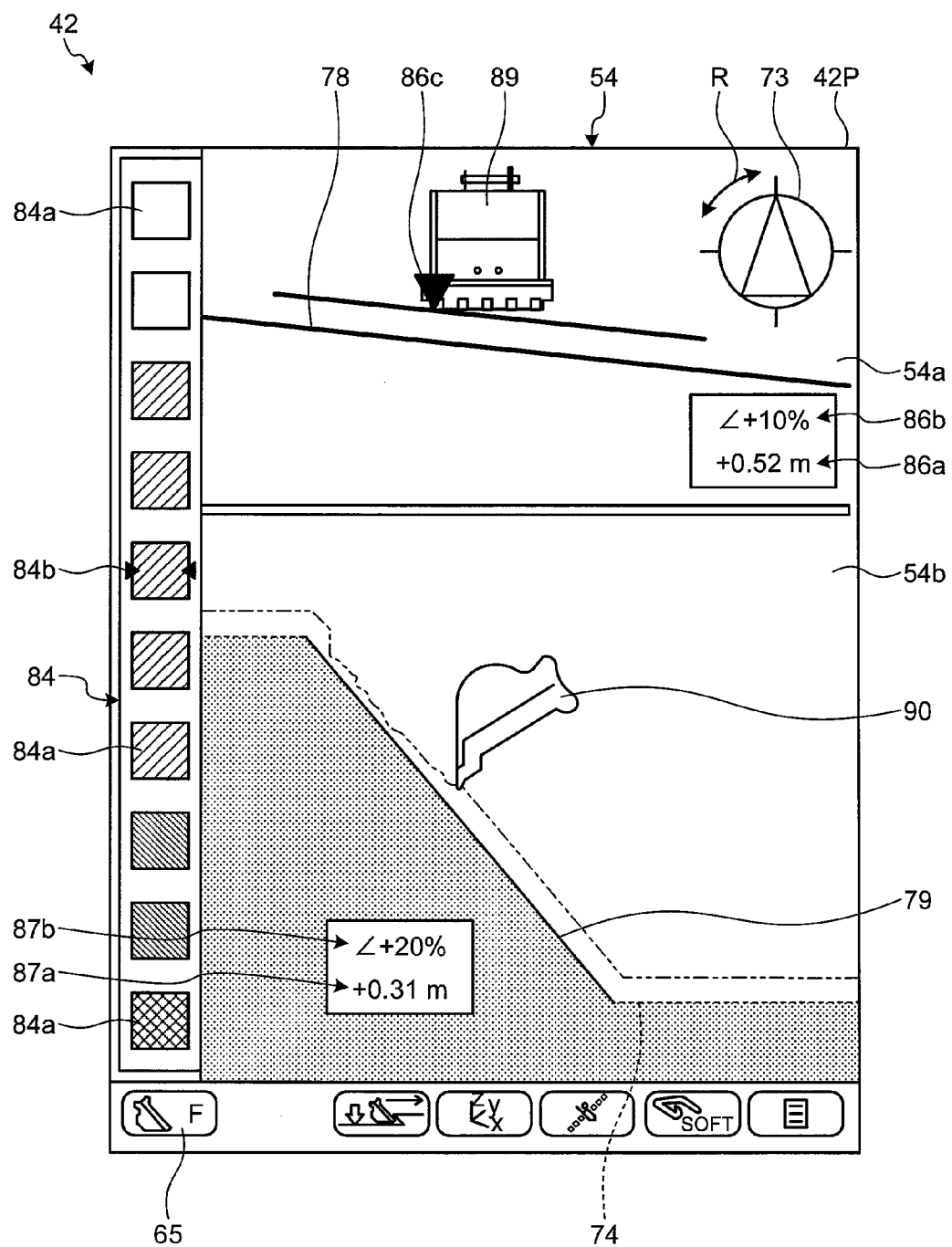
FIG. 7 is a diagram illustrating an example of a guide screen.

FIGS. 6 and 7 are diagrams illustrating examples of the guide screen. The guide screen is a screen that indicates positional relation between the target surface 70 and the excavation edge portion P3 of the bucket 8, and guides the work machine 2 of the excavator 100 so that the ground as the object to be worked can be formed into the same shape as the target surface 70. As illustrated in FIGS. 6 and 7, the guide screen includes a guide screen in a rough excavation mode (hereinafter, properly referred to as a rough excavation screen 53) and a guide screen in a fine excavation mode (hereinafter, properly referred to as a fine excavation screen 54).

(Rough Excavation Screen 53)

The rough excavation screen 53 illustrated in FIG. 6 is displayed on a screen 42P of the display unit 42. The rough excavation screen 53 includes a top view 53a that indicates the design topography of a work area and a current position of the excavator 100 and a side view 53b that indicates the positional relation between the target surface 70 and the excavator 100. The top view 53a of the rough excavation screen 53 expresses the design topography in a top view with a plurality of triangle polygons. To be more specific, the top view 53a expresses the design topography on a swing plane on which the excavator 100 swings as a plane of projection. Therefore, the top view 53a is a bird's-eye view as viewed from directly above the excavator 100, and when the excavator 100 is inclined, the design surface is inclined as well.

Also, the target surface 70 selected as the target object to be worked from among the plurality of design surfaces 45 is displayed in a different color from the other design surfaces 45. Note that, in FIG. 6, the current position of the excavator 100 is indicated by an icon 61 of the excavator in a top view. However, the current position may be indicated by other symbols. Further, the top view 53a includes information for causing the excavator 100 to face the target surface 70. The information for causing the excavator 100 to face the target surface 70 is displayed as a target surface facing compass 73. The target surface facing compass 73 is an icon to indicate a facing direction with respect to the target surface 70 and a direction into which the excavator 100 is swung by an arrow-shaped pointer 731 turning to the directions of the arrow R, for example. The operator of the excavator 100 can confirm the degree of facing to the target surface 70 with the target surface facing compass 73.

The side view 53b of the rough excavation screen 53 includes an image that indicates the positional relation between the target surface 70 and the excavation edge portion P3 of the bucket 8 and distance information that indicates the distance between the target surface 70 and the excavation edge portion P3 of the bucket 8. To be specific, the side view 53b includes a line 74 that indicates a cross section of a design surface, a line 79 that indicates a cross section of a target surface, and an icon 75 of the excavator 100 in a side view. The line 74 that indicates a cross section of a design surface indicates a cross section of the design surfaces 45 other than the target surface 70. The line 79 that indicates a cross section of a target surface indicates a cross section of the target surface 70. The line 74 that indicates a cross section of a design surface and the line 79 that indicates a cross section of a target surface can be obtained, as illustrated in FIG. 5, by calculating a line of intersection 80 between a plane 77 that passes through a current position of the excavation edge portion P3 of the bucket 8 and the design surface 45. The line of intersection 80 is obtained by the processor 44 of the display control device 39. A method of obtaining the current position of the excavation edge portion P3 of the bucket 8 will be described below.

In the side view 53b, the line 79 that indicates a cross section of a target surface is displayed in a different color from the line 74 that indicates a cross section of a design surface. Note that, in FIG. 6, the line 79 that indicates a cross section of a target surface and the line 74 that indicates a cross section of a design surface are expressed in a different type of line. Also, in the side view 53b, an area at an underground side of the line 79 that indicates a cross section of a target surface and the line 74 that indicates a cross section of a design surface and an area at an air side of these lines are indicated by different colors. In FIG. 6, the area at an underground side of the line 79 that indicates a cross section of a target surface and the line 74 that indicates a cross section of a design surface is hatched, so that the difference in color is expressed.

The distance information that indicates the distance between the target surface 70 and the excavation edge portion P3 of the bucket 8 includes numerical value information 83 and graphic information 84. The numerical value information 83 is a numerical value that indicates a shortest distance between the excavation edge portion P3 of the bucket 8 and the target surface 70. The graphic information 84 is information that graphically indicates the distance between the excavation edge portion P3 of the bucket 8 and the target surface 70. The graphic information 84 is a guidance indicator that indicates a position of the excavation edge portion P3 of the bucket 8. To be specific, the graphic information 84 includes index bars 84a and an index mark 84b that indicates a position where the distance between the excavation edge portion P3 of the bucket 8 and the target surface 70 corresponds to zero among the index bars 84a. Each of the index bars 84a lights up in accordance with a shortest distance between a tip of the bucket 8 and the target surface 70. Note that, on/off of the display of the graphic information 84 may be changeable by an operation of the operator of the excavator 100.

As described above, on the rough excavation screen 53, relative positional relation between the line 79 that indicates a cross section of a target surface and the excavator 100 and a numerical value that indicates a shortest distance between the excavation edge portion P3 of the bucket 8 and the line 79 that indicates a cross section of a target surface are displayed. The operator of the excavator 100 can easily excavate the ground such that current topography is formed into the design topography by causing the excavation edge portion P3 of the bucket 8 to move along the line 79 that indicates a cross section of a target surface. Note that a screen switching key 65 for switching the guide screen is displayed on the rough excavation screen 53. The operator can switch the rough excavation screen 53 into the fine excavation screen 54 by operating the screen switching key 65.

(Fine Excavation Screen 54)

The fine excavation screen 54 illustrated in FIG. 7 is displayed on the screen 42P of the display unit 42. The fine excavation screen 54 indicates the positional relation between the target surface 70 and the excavator 100 in more detail than the rough excavation screen 53. That is, the fine excavation screen 54 indicates the positional relation between the target surface 70 and the excavation edge portion P3 of the bucket 8 in more detail than the rough excavation screen 53. The fine excavation screen 54 includes a front view 54a that indicates the target surface 70 and the bucket 8 and a side view 54b that indicates the target surface 70 and the bucket 8. The front view 54a of the fine excavation screen 54 includes an icon 89 that indicates the bucket 8 in a front view and a line 78 that indicates a cross section of a target surface in a front view. A front face (front view) means that the bucket 8 illustrated in FIGS. 1 and 2 is viewed from the vehicle body 1 side, and that the bucket 8 is viewed parallel to the Ya axis in the vehicle body coordinate system described below.

The side view 54b of the fine excavation screen 54 includes an icon 90 of the bucket 8 in a side view, the line 74 that indicates a cross section of a design surface, and the line 79 that indicates a cross section of a target surface. Further, information that indicates the positional relation between the target surface 70 and the bucket 8 is displayed on each of the front view 54a and the side view 54b of the fine excavation screen 54. A side face (side view) means viewing from an extending direction of the bucket pin 15 illustrated in FIGS. 1 and 2 (from a central axis direction of swing of the bucket 8), and viewing parallel to the Xa axis in the vehicle body coordinate system described below.

In the front view 54a, the information indicates the positional relation between the target surface 70 and the bucket 8 includes distance information 86a and angle information 86b.

The distance information 86a indicates a distance between the excavation edge portion P3 of the bucket 8 and the target surface 70 in the Za direction. This distance is a distance between a closest position among positions of the excavation edge portion P3 of the bucket 8 in a width direction with respect to the target surface 70 and the target surface 70. A mark 86c that indicates the closest position is superimposed and displayed on the icon 89 that is a front view of the bucket 8 in the front view 54a. The angle information 86b is information that indicates an angle between the target surface 70 and the bucket 8. To be specific, the angle information 86b is an angle between a virtual line segment that passes through the excavation edge portion P3 of the bucket 8 and the line 78 that indicates a cross section of a target surface.

In the side view 54b, the information that indicates the positional relation between the target surface 70 and the bucket 8 includes distance information 87a and angle information 87b. The distance information 87a indicates a shortest distance between the excavation edge portion P3 of the bucket 8 and the target surface 70, that is, a distance between a tip of the bucket 8 in a perpendicular line direction of the target surface 70 and the target surface 70. Also, the angle information 87b is information that indicates an angle between the target surface 70 and the bucket 8. To be specific, the angle information 87b displayed on the side view 54b is an angle between a base surface of the bucket 8 and the line 79 that indicates a cross section of a target surface.

The fine excavation screen 54 includes the graphic information 84 that graphically indicates the distance between the excavation edge portion P3 of the bucket 8 and the target surface 70 described above. The graphic information 84 includes the index bars 84a and the index mark 84b similarly to the graphic information 84 of the rough excavation screen 53. As described above, the relative positional relation between the lines 78 and 79 that indicate cross sections of target surfaces and the excavation edge portion P3 of the bucket 8 is displayed on the fine excavation screen 54 in detail. The operator of the excavator 100 can easily excavate the ground such that current topography is formed into the same shape as three-dimensional design topography by causing the excavation edge portion P3 of the bucket 8 to move along the lines 78 and 79 that indicate cross sections of target surfaces. Note that the screen switching key 65 is displayed on the fine excavation screen 54 similarly to the above-described rough excavation screen 53. The operator can switch the fine excavation screen 54 into the rough excavation screen 53 by operating the screen switching key 65.

<A Method of Obtaining a Current Position of the Excavation Edge Portion P3 of the Bucket 8>

The line 79 that indicates a cross section of a target surface is calculated from a current position of the excavation edge portion P3 of the bucket 8. The display control device 39 obtains a current position of the excavation edge portion P3 of the bucket 8 in a global coordinate system {x, y, z} based on detection results of the three-dimensional position sensor 23, the first stroke sensor 16, the second stroke sensor 17, the third stroke sensor 18, the inclination angle sensor 24, and the like. In the present embodiment, the current position of the excavation edge portion P3 of the bucket 8 can be obtained as follows.

Figure 8:
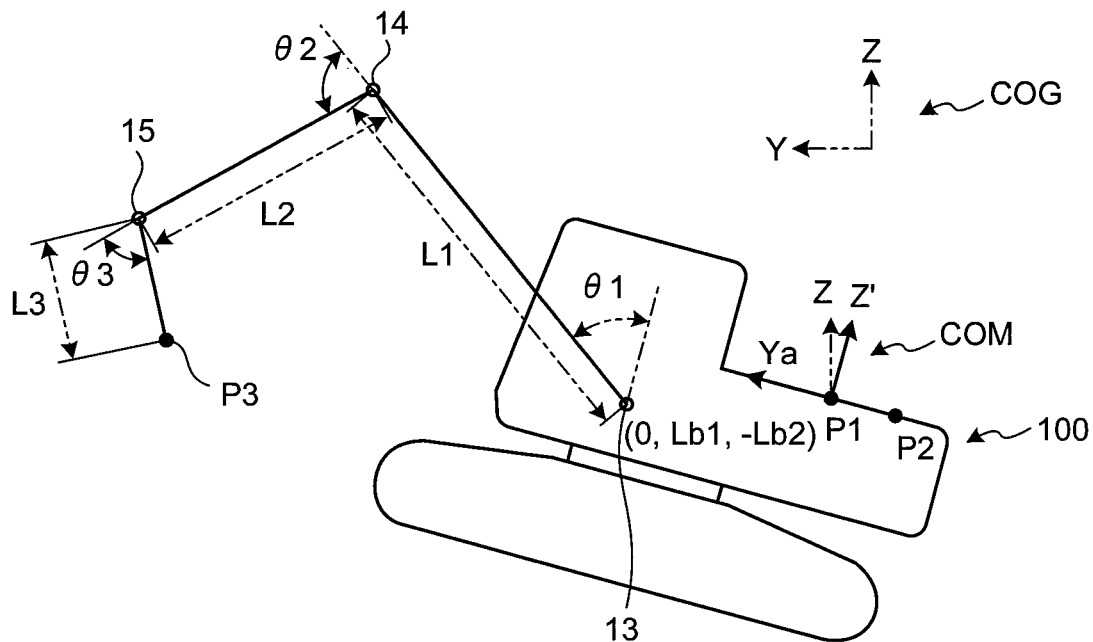
FIG. 8 is a diagram for describing an example of a method of obtaining a current position of an excavation edge portion P3.
Figure 9:
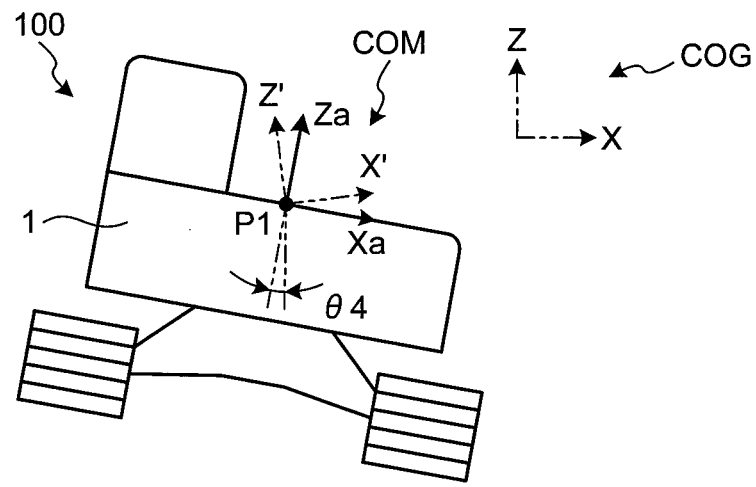
FIG. 9 is a diagram for describing the example of a method of obtaining a current position of an excavation edge portion P3.

FIGS. 8 and 9 are diagrams for describing an example of a method of obtaining the current position of the excavation edge portion P3. FIG. 8 is a side view of the excavator 100 and FIG. 9 is a rearview of the excavator 100. In obtaining the current position of the excavation edge portion P3 of the bucket 8, the display control device 39 obtains the vehicle body coordinate system {Xa, Ya, Za} with an origin at the location P1 of the above-described GNSS antenna 21 as illustrated in FIG. 8. In the present embodiment, a front-rear direction of the excavator 100, that is, the Ya axis direction in the coordinate system (vehicle body coordinate system) COM of the vehicle body 1 is inclined with respect to the Y-axis direction in the global coordinate system COG. Also, the coordinate of the boom pin 13 in the vehicle body coordinate system COM is (0, Lb1, −Lb2), and is stored in the storage unit 43 of the display control device 39 in advance. In the vehicle body coordinate system COM, the excavator 100 has the upper swing body 3 to swing on a plane parallel to an Xa-Ya plane. In the vehicle body coordinate system COM, the work machine 2 of the excavator 100 is driven by the boom cylinder 10, the arm cylinder 11, and the bucket cylinder 12, and the boom 6, the arm 7, and the bucket 8 move along an Ya-Za plane. When the boom cylinder 10, the arm cylinder 11, and the bucket cylinder 12 drive, the arm 7 moves along the Ya-Za plane in the vehicle body coordinate system COM determined in accordance with a posture (tilt) of the vehicle body 1, and the bucket 8 moves, accordingly.

The three-dimensional position sensor 23 illustrated in FIG. 4 detects the locations P1 and P2 of the GNSS antennas 21 and 22 illustrated in FIG. 2. A unit vector in the Ya axis direction is calculated from coordinate positions of the detected locations P1 and P2 with a formula (1).

[Formula 1]

$$Ya = (P1-P2)/|P1-P2| \quad (1)$$

As illustrated in FIG. 8, when a vector Z' that passes through a plane expressed by two vectors Ya and Z and is perpendicular to Ya is introduced, formulae (2) and (3) are established. "c" in the formula (3) is a constant. "Z'" is expressed in a formula (4) from the formulae (2) and (3). Further, "X'" is expressed in a formula (5) where a vector perpendicular to Ya and Z' is X'.

[Formula 2]

$$(Z', Ya) = 0 \quad (2)$$

[Formula 3]

$$Z'(1-c) \times Z + c \times Ya \quad (3)$$

[Formula 4]

$$Z' = Z + \{(Z, Ya)/((Z, Ya)-1)\} \times (Ya-Z) \quad (4)$$

[Formula 5]

$$X' = Ya \perp Z' \quad (5)$$

As illustrated in FIG. 9, the vehicle body coordinate system COM is expressed in a formula (6) because the coordinate system is rotated around the Ya axis by the above-described roll angle θ4.

[Formula 6]

$$[Xa \ Ya \ Za] = [X' \ Ya \ Z'] \begin{bmatrix} \cos\theta 4 & 0 & \sin\theta 4 \\ 0 & 1 & 0 \\ -\sin\theta 4 & 0 & \cos\theta 4 \end{bmatrix} \quad (6)$$

Also, the current inclination angles θ1, θ2, and θ3 of the boom 6, the arm 7, and the bucket 8 described above are calculated from detection results of the first stroke sensor 16, the second stroke sensor 17, and the third stroke sensor 18.

The coordinate (xat, yat, zat) of the excavation edge portion P3 of the bucket 8 in the vehicle body coordinate system COM can be obtained with the formulae (7), (8), and (9) using the inclination angles θ1, θ2, and θ3 and the lengths L1, L2, and L3 of the boom 6, the arm 7, and the bucket 8. The excavation edge portion P3 of the bucket 8 moves on the Ya-Za plane in the vehicle body coordinate system COM. The coordinate of the excavation edge portion P3 of the bucket 8 in the global coordinate system COG can be obtained with a formula (10). The coordinate of the excavation edge portion P3 in the global coordinate system COG is a position of the excavation edge portion P3.

[Formula 7]

$$xat=0 \quad (7)$$

[Formula 8]

$$yat=Lb1+L1 \times \sin\theta1+L2 \times \sin(\theta1+\theta2)+L3 \times \sin(\theta1+\theta2+\theta3) \quad (8)$$

[Formula 9]

$$zat=-Lb2+L1 \times \cos\theta1+L2 \times \cos(\theta1+\theta2)+L3 \times \cos(\theta1+\theta2+\theta3) \quad (9)$$

[Formula 10]

$$P3=xat \cdot Xa+yat \cdot Ya+zat \cdot Za+P1 \quad (10)$$

The display control device 39 calculates the line of intersection 80 between the three-dimensional design topography and the Ya-Za plane 77 that passes through the excavation edge portion P3 of the bucket 8 as illustrated in FIG. 5 based on the current position of the excavation edge portion P3 of the bucket 8 calculated in the manner described above and the design topographic data stored in the storage unit 43. Then, the display control device 39 displays, on the guide screen, a portion in the line of intersection 80, which passes through the target surface 70, as the above-described line 79 that indicates a cross section of a target surface. Next, an example in which the display control device 39 illustrated in FIG. 4 displays the current position of the excavation edge portion P3 on the screen 42P of the display unit 42 of the display input device 38 in a top view when the bucket 8 excavates the ground that is to be an object to be worked.

<A Top View Display of an Excavation Edge Portion of a Bucket>

Figure 10:
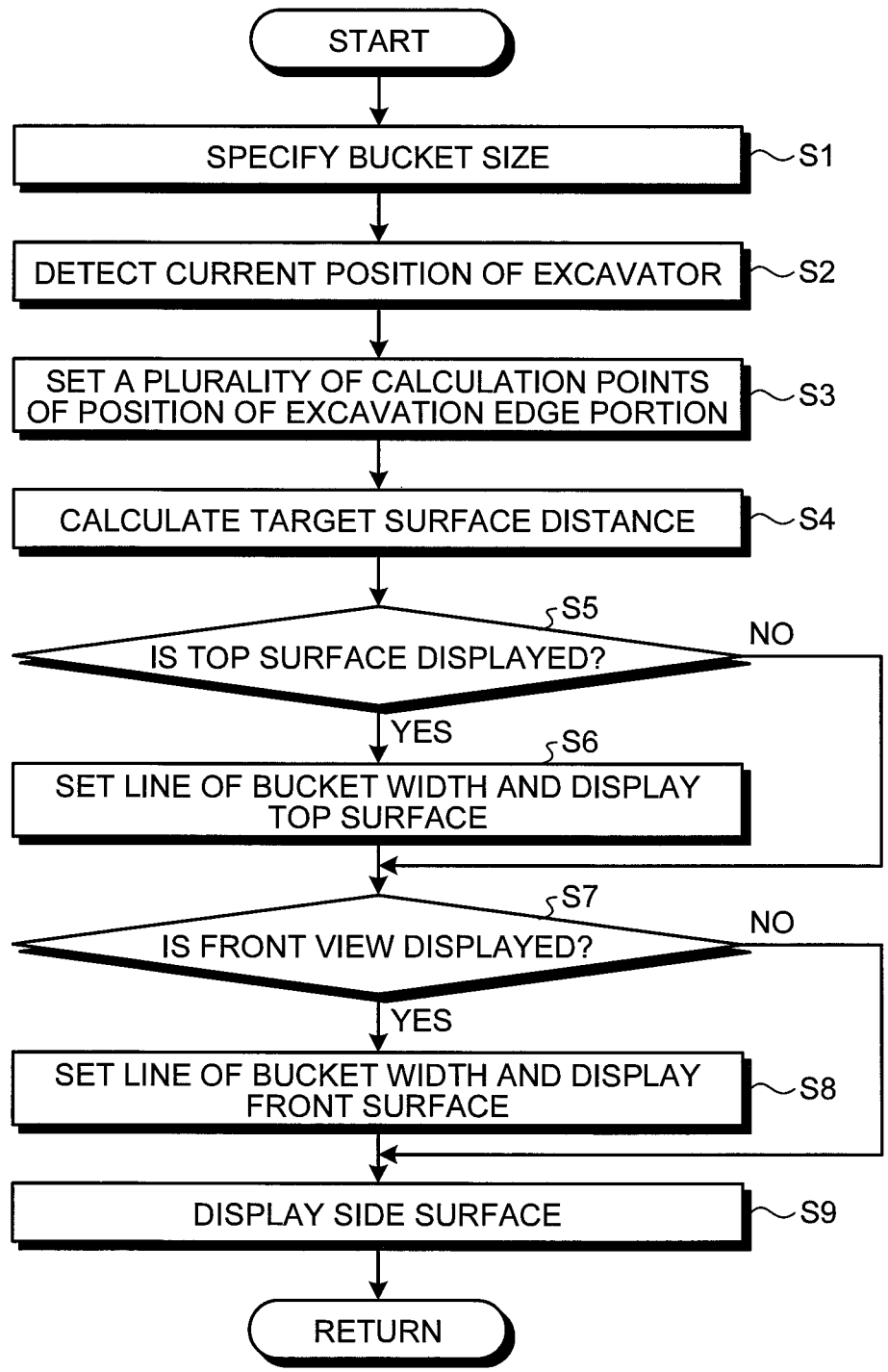
FIG. 10 is a flowchart illustrating a procedure of displaying the excavation edge portion P3 in a top view.

FIG. 10 is a flowchart illustrating a procedure of displaying the excavation edge portion P3 in a top view. In displaying the excavation edge portion P3 on the screen 42P of the display unit 42 illustrated in FIG. 4, the display control device 39, to be more specific, the processor 44 specifies a bucket size in step S1. In the work machine 2, the bucket 8 is freely detachable from the arm 7, and the bucket 8 can be changed and attached to the arm 7. Bucket appearance information that is input from the input unit 41 and specifies the size of the bucket 8 is stored in the storage unit 43 of the display control device 39 illustrated in FIG. 4.

Figures 11, 12:
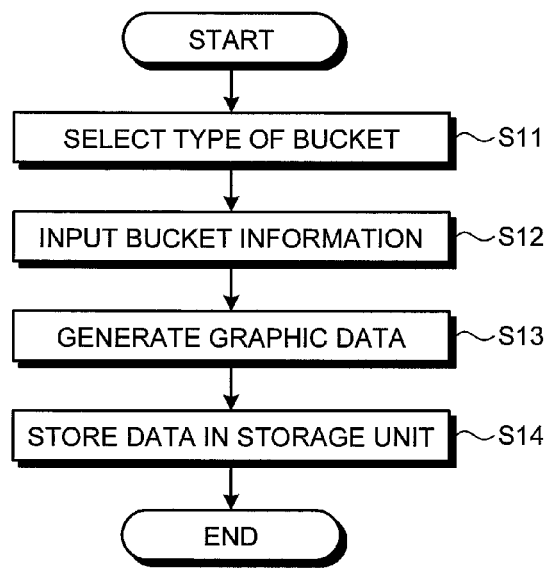
FIG. 11 is a flowchart illustrating a procedure of storing appearance information of a bucket 8.
FIG. 12 is a diagram illustrating an example of the appearance information of the bucket 8.
Figure 13:
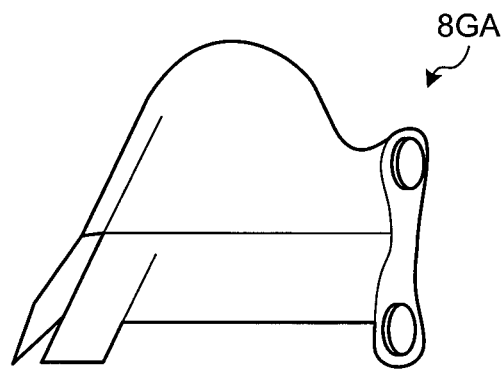
FIG. 13 is a diagram illustrating an appearance display example of the bucket 8.
Figure 14:
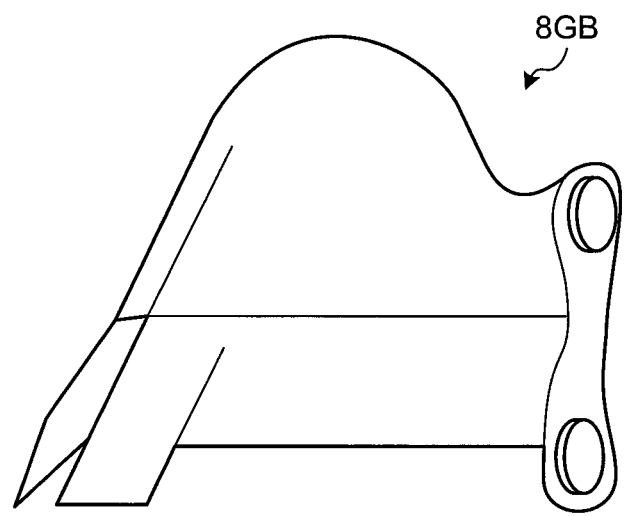
FIG. 14 is a diagram illustrating an appearance display example of the bucket 8.
Figure 15:
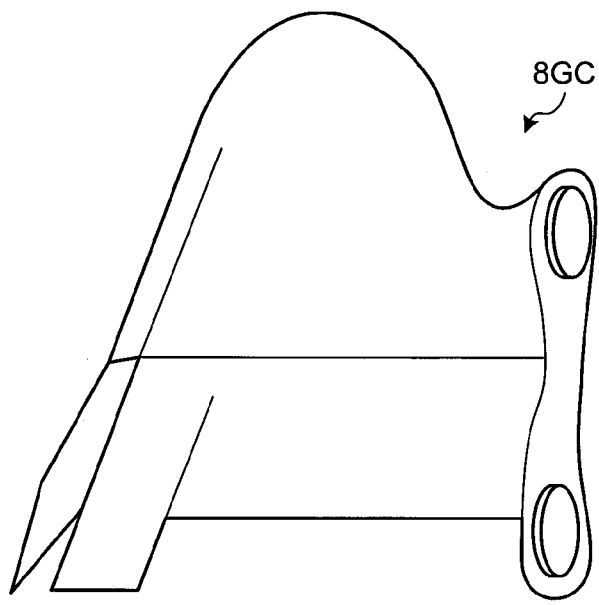
FIG. 15 is a diagram illustrating an appearance display example of the bucket 8.
Figure 16:
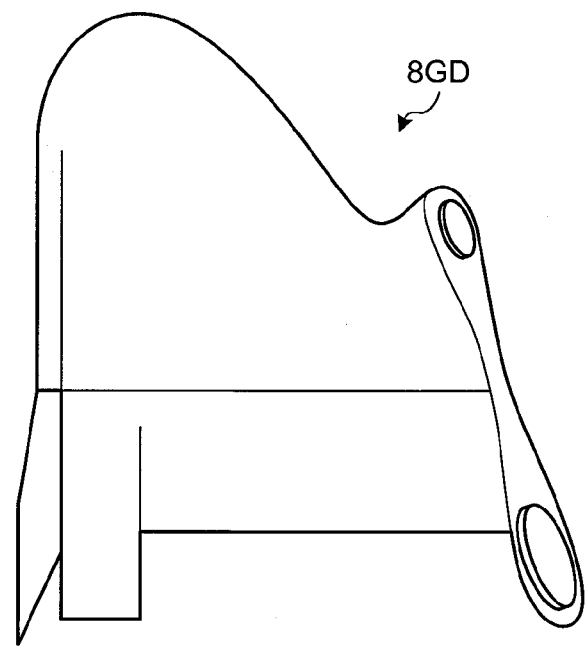
FIG. 16 is a diagram illustrating an appearance display example of the bucket 8.

Here, a procedure in which the storage unit 43 stores the bucket appearance information will be described using FIGS. 11 to 16. FIG. 11 is a flowchart illustrating a procedure of storing the appearance information of the bucket 8. FIG. 12 is a diagram illustrating an example of the appearance information of the bucket 8. FIGS. 13 to 16 are diagrams illustrating appearance display examples of the bucket 8. As illustrated in FIG. 11, the input unit 41 of the display input device 38 waits for an input. As illustrated in step S11, the display input device 38 receives a selection of a bucket type, and the processor 44 stores, in the storage unit 43, information of the selection of a bucket type received by the display input device 38.

For example, the processor 44 stores a type identification code 1 as a standard bucket like the above-described bucket 8 in association with a registration identification code illustrated in FIG. 12. The processor 44 stores a type identification code as a tilt bucket described below in association with a registration identification code. Next, as illustrated in FIG. 11, the display input 38 receives bucket information, and the processor 44 stores the bucket information, an input of which is received by the display input device 38, in the storage unit 43 in step S12. This bucket information is, for example, sizes A, B, C, D, and E as illustrated in FIG. 12. The sizes A, B, C, D, and E are, for example, a bucket width, a bucket length, a depth of a concave portion, and a bucket height of the bucket 8.

Next, in step S13, the processor 44 calculates and generates shapes of graphic data 8GA, 8GB, 8GC, and 8GD of icons of the bucket 8 illustrated in FIGS. 13 to 16 based on the appearance information of the bucket illustrated in FIG. 12, for example. The graphic data 8GA, 8GB, 8GC, and 8GD of the icons are information that graphically indicates the shapes that satisfy the information such as the sizes A, B, C, D, and E indicated in the appearance information of the bucket illustrated in FIG. 12. Next, in step S14, the processor 44 stores, in the storage unit 43, the graphic data 8GA, 8GB, 8GC, and 8GD of the icons of the bucket 8 generated in step S13. Then, in step S1 as described above, the processor 44 reads out the graphic data 8GA, 8GB, 8GC, and 8GD of the icons stored in the storage unit 43 and specifies the bucket sizes based on an input of the input unit 41.

Next, in step S2 illustrated in FIG. 10, the processor 44 detects a current position of the excavator 100. The display control device 39 detects a current position of the vehicle body 1 based on a detection signal from the three-dimensional position sensor 23.

Figure 17:
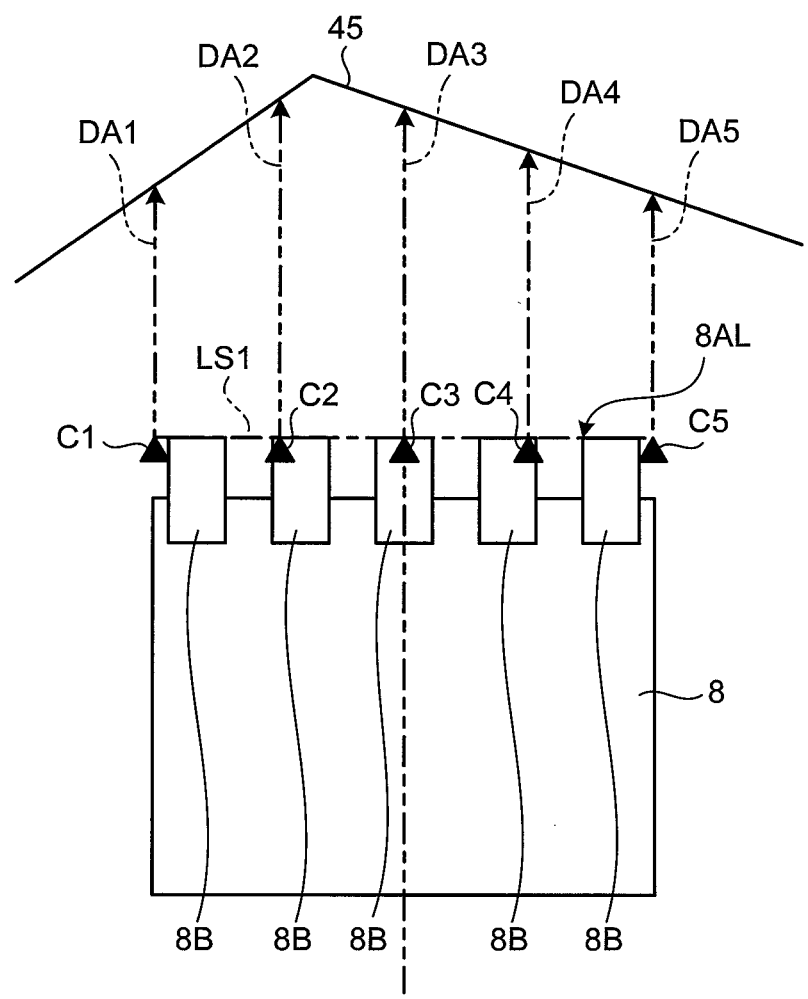
FIG. 17 is an explanatory diagram describing a display example of the excavation edge portion P3.

Next, in step S3, the processor 44 sets a plurality of calculation points on the excavation edge portion P3 of the bucket 8. FIG. 17 is an explanatory diagram that illustrates a display example of the excavation edge portion P3. As illustrated in FIG. 17, a virtual line segment LS1 that passes through a plurality of tips of the blades 8B of the bucket 8 and accords with the size of the bucket 8 in the width direction is calculated. Note that the processor 44 reads out the size of the bucket 8 in the width direction from the bucket appearance information specified in step S1, and calculates the virtual line segment LS1. This virtual line segment LS1 serves as a line segment 8AL that indicates a position of the excavation edge portion P3.

Next, the processor 44 equally divides the virtual line segment LS1 into a plurality of ranges (for example, four ranges), and sets five points that indicate boundaries and both ends of the ranges as a first calculation point C1, a second calculation point C2, a third calculation point C3, a fourth calculation point C4, and a fifth calculation point C5, respectively. The number of division i is a natural number, and in the present embodiment, i is 1, 2, 3, 4, and 5. That is, the first calculation point C1, the second calculation point C2, the third calculation point C3, the fourth calculation point C4, and the fifth calculation point C5 indicate a plurality of specific positions of the excavation edge portion P3 of the bucket 8 in the width direction. Then, the processor 44 calculates current positions of the first calculation point C1, the second calculation point C2, the third calculation point C3, the fourth calculation point C4, and the fifth calculation point C5 based on the current position of the excavator 100 detected in step S2. To be specific, the processor 44 calculates a current position of the central third calculation point C3 with the above-described method of calculating a current position of the excavation edge portion P3 of the bucket 8. Then, the processor 44 calculates the current positions of the other first calculation point C1, second calculation point C2, fourth calculation point C4, and fifth calculation point C5 from the current position of the central third calculation point C3, the size of the bucket 8 in the width direction, and the extending direction of the virtual line segment LS1.

Figure 18:
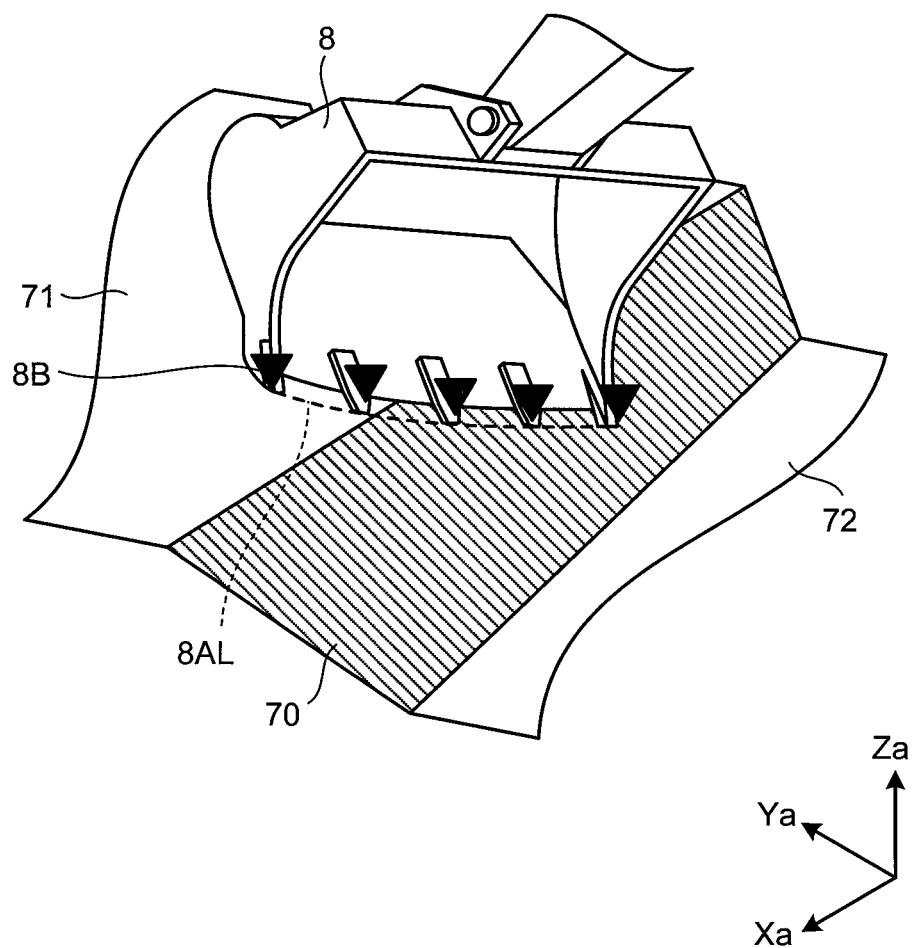
FIG. 18 is a perspective view for describing rotation of the excavation edge portion P3.
Figure 19:
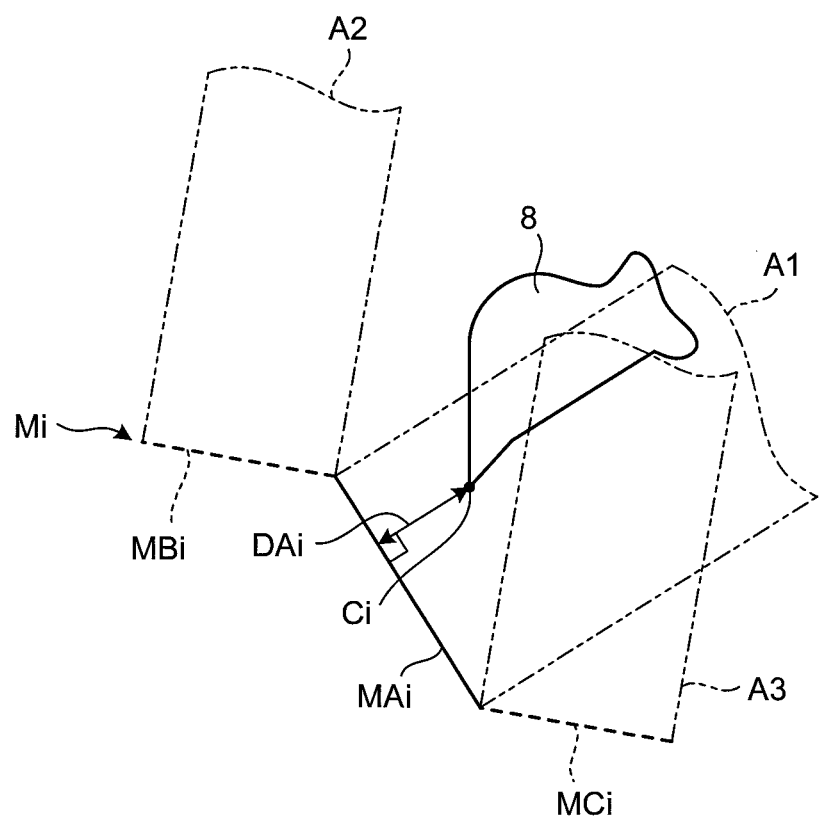
FIG. 19 is a side view for describing a target surface distance DAi.

FIG. 18 is a perspective view for describing rotation of the excavation edge portion P3. FIG. 19 is a side view for describing a target surface distance DAi. As described above, the bucket 8 is swingably attached to a tip portion of the arm 7 via the bucket pin 15. The bucket 8 may rotate, for example, such that a tip of the blade 8B describes an arc around the bucket pin 15 of the bucket 8 as proceeding from an uppermost end (slope shoulder) 71 of a slope of the target surface 70 to a lowermost end (slope toe) 72 of the target surface 70. This allows the line segment 8AL that indicates a position of the excavation edge portion P3 to rotate in such a way so as to describe an arc. The above-described length L3 of the bucket 8 is a radius of the arc of the rotation.

In step S4, the processor 44 calculates a distance between each of straight lines Mai to MCi included in a line of intersection Mi and the i-th calculation point Ci where a line of intersection between the Ya-Za plane that passes through the i-th calculation point Ci and the design surface 45 is Mi. Here, a perpendicular line that passes through the i-th calculation point Ci is calculated with respect to each of the straight lines MAi to MCi included in the line of intersection Mi, and a distance between each of the straight lines MAi to MCi and the i-th calculation point Ci is calculated. For example, as illustrated in FIG. 19, when the i-th calculation point Ci is positioned within a target area A1 among target areas A1, A2, and A3, a perpendicular line of the target line MAi that passes through the i-th calculation point Ci is calculated, and a shortest distance (hereinafter, referred to as a "target surface distance DAi") between the i-th calculation point Ci and the target line MAi is calculated. In this way, the processor 44 calculates distances DA1 to DA5 illustrated in FIG. 17, and allows a shortest distance to be the target surface distance DA1.

Figure 20:
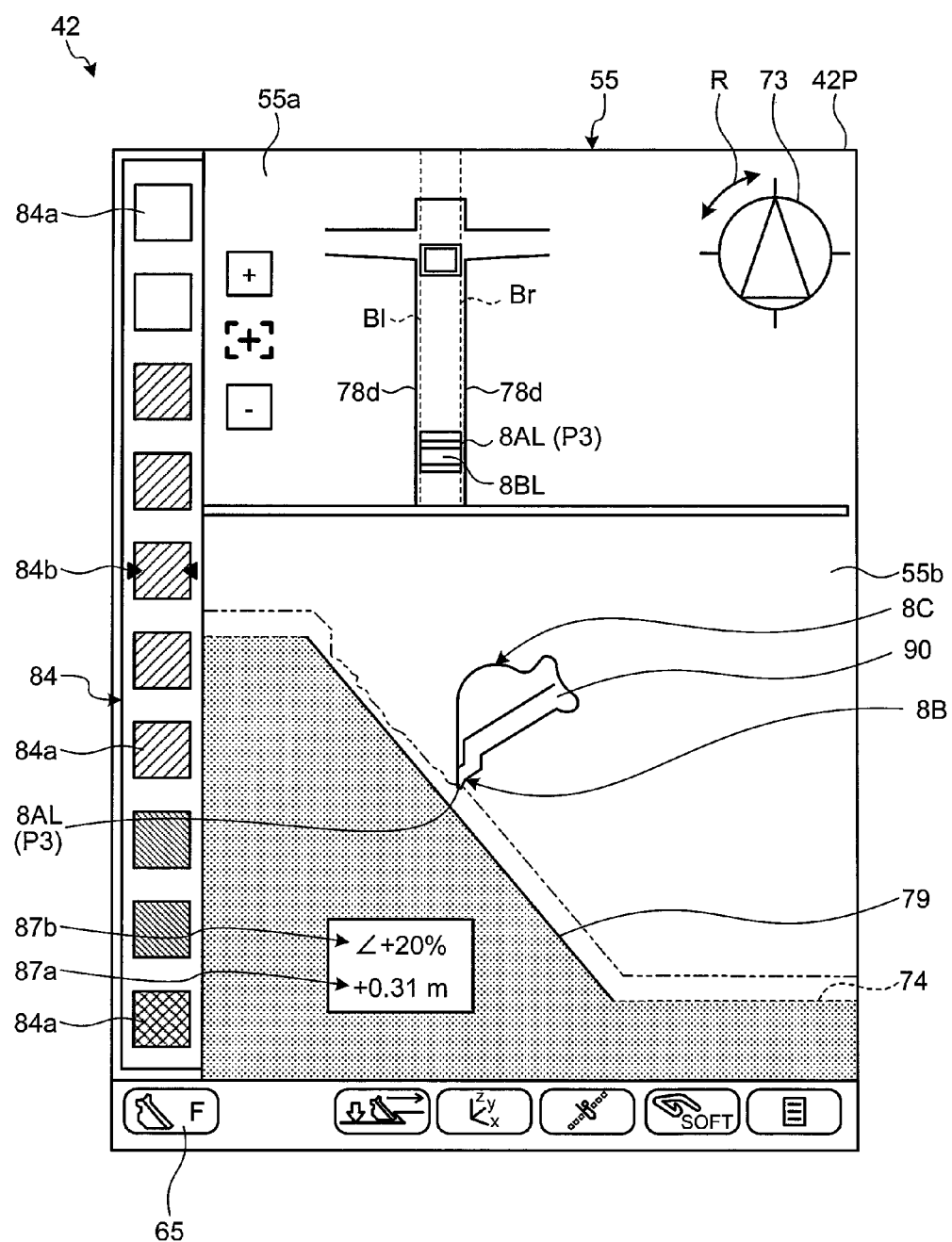
FIG. 20 is a diagram illustrating an example of displaying the bucket 8 in a top view on a screen of a display unit.

FIG. 20 is a diagram illustrating an example of a bucket in a top view on a screen of a display unit. In step S5, the processor 44 waits for an input of a top view display. The processor 44 performs a process of reading out the bucket appearance information stored in the storage unit 43 and sets a line of the bucket width when there is an input of a top view display (yes at step S5). Then, the processor 44 performs a top view display of displaying a top view 55a on the screen 42P of the display unit 42 (step S6).

A fine excavation screen 55 illustrated in FIG. 20 includes the top view 55a that indicates the design topography (a target shape of an object to be worked) and the bucket 8, and a side view 55b that indicates a target surface 79 and the bucket 8. The top view 55a of the fine excavation screen 55 includes, when the design topography is a groove, a line 78d that indicates a wall surface of the groove in a top view. A top face (the top view) means that the bucket 8 illustrated in FIGS. 1 and 2 is viewed from above in a direction parallel to the Za axis in the vehicle body coordinate system described above. This allows the operator to easily and intuitively grasp a posture of the work machine 2 illustrated in FIGS. 1 and 2. For example, the processor 44 reads out the size of the bucket 8 in the width direction from the bucket appearance information specified in step S1, and obtains an outline 8BL in a top view based on information of appearance of the bucket 8 projected in the vertical direction. Next, the processor 44 obtains virtual images Br and Bl that indicate positions of planes parallel to the Ya-Za plane and passing through both ends of the excavation edge portion P3 in a top view.

As described above, in the vehicle body coordinate system COM, the work machine 2 of the excavator 100 has the boom 6, the arm 7, and the bucket 8 driven by the boom cylinder 10, the arm cylinder 11, and the bucket cylinder 12 along the Ya-Za plane. When the boom cylinder 10, the arm cylinder 11, and the bucket cylinder 12 drive, the arm 7 moves along the Ya-Za plane in the vehicle body coordinate system COM determined in accordance with a posture (tilt) of the vehicle body 1, and the bucket 8 moves, accordingly. The processor 44 can calculate the positions of the planes parallel to the Ya-Za plane and passing through the both ends of the excavation edge portion P3 by obtaining the vehicle body coordinate system COM determined in accordance with a posture (tilt) of the vehicle body 1 and the width size of the bucket 8, that is, information of the length of the excavation edge portion P3 from the storage unit 43. Accordingly, the processor 44 displays the virtual images Br and Bl that indicate the positions of the planes parallel to the Ya-Za plane and passing through the both ends of the excavation edge portion P3 based on the information related to the current position of the excavator 100, the information related to the posture of the vehicle body 1, and the appearance information of the bucket 8. In this way, the virtual images Br and Bl indicate planes passing through the both ends of the excavation edge portion P3 and parallel to the Ya-Za plane when the excavator 100 is viewed from above in the direction parallel to the Za axis. Then, the processor 44 displays the virtual images Br and Bl along with the outline 8BL of the bucket 8 when the excavator 100 is viewed from above in the direction parallel to the Za axis. The virtual images Br and Bl indicate a direction of excavation (excavation direction) of the bucket 8 with the excavation edge portion P3. In the present embodiment, the virtual images Br and Bl are indicated in dotted virtual lines. However, the indication is not limited to the dotted lines. For example, the virtual images Br and Bl may be virtual lines in a solid line, a wavy line, a chain line, a two-dot chain line, and the like. Also, the virtual images Br and Bl include continuous or dotted points, characters, line drawing, and the like that pass through the both ends of the excavation edge portion P3 and by which the positions of the planes parallel to the Ya-Za plane can be recognized at a glance.

The line 78 that indicates the wall surface of the groove and the virtual images Br and Bl are simultaneously displayed, whereby the operator can easily adjust the positions of the groove and the excavation edge portion P3 during work of the groove excavation by the excavator 100. That is, the virtual images Br and Bl give an indication of a portion to be a groove in the future when the groove is excavated with the bucket 8, whereby the adjustment of the positions of the groove and the excavation edge portion P3 becomes easy.

Note that the processor 44 displays the line segment 8AL that indicates the position of the excavation edge portion 8BL in the top view 55a in preference to a part of the displayed outline 8BL of the bucket 8 when an inner side of the outline 8BL of the bucket 8 and a position of a line segment P3 that indicates the excavation edge portion P3 are overlapped in a top view. Therefore, in the top view 55a illustrated in FIG. 20, the line segment 8AL that indicates the position of the excavation edge portion P3 comes to a position where the line segment 8AL cannot be seen in a normal situation because of the outline 8BL of the bucket 8. However, the operator can visually recognize the line segment 8AL that indicates the position of the excavation edge portion P3. As a result, the display system 28 of the excavating machine can provide the operator with the position of the excavation edge portion P3 associated with the swing of the bucket 8 in an easy-to-understand manner when the operator carries out works according to the design surface.

Further, the processor 44 may highlight the line segment 8AL by displaying the line segment 8AL in a different color from the outline 8BL of the bucket 8. Further, the processor 44 may highlight the line segment 8AL by displaying the line segment 8AL in a thicker line than the outline 8BL of the bucket 8. Alternatively, the processor 44 may highlight the line segment 8AL by displaying the line segment 8AL with a higher brightness than the outline 8BL of the bucket 8.

Although the processor 44 has used the line segment 8AL as an indicator that indicates the excavation edge portion P3, the indicator is not limited to the line segment. A triangle mark, an arrow mark, or the like may be used, which indicates the first calculation point C1, the second calculation point C2, the third calculation point C3, the fourth calculation point C4, and the fifth calculation point C5 described above.

Figure 21:
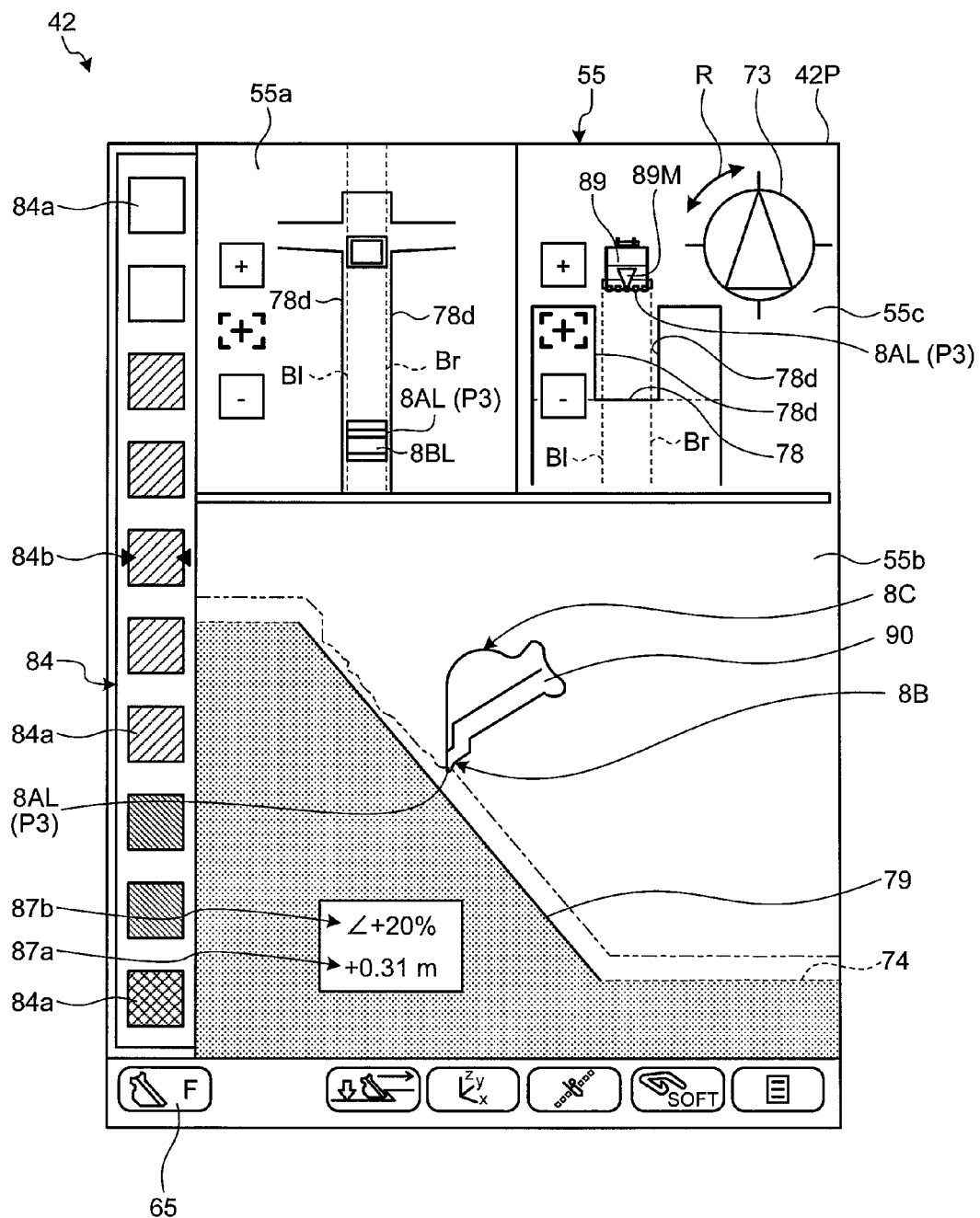
FIG. 21 is a diagram illustrating an example of displaying the bucket 8 in a top view and in a front view on the screen of the display unit.

When there is no input of a top view display (no at step S5), the top view 55b becomes undisplayed and the processor 44 processes step S7. Next, in step S7, the processor 44 waits for an input of a front view display. FIG. 21 is a diagram illustrating an example of displaying a bucket in a top view and in a front view on a screen of a display unit. The processor 44 performs a process of reading out the bucket appearance information stored in the storage unit 43 when there is an input of a front view display (yes at step S7), and sets a line of the bucket width. Then, the processor 44 performs a front view display in which a front view 55c is displayed on the screen 42P of the display unit 42 (step S8).

The fine excavation screen 55 illustrated in FIG. 21 includes the top view 55a that indicates the line 78 indicating a cross section of a target surface and the bucket 8, the side view 55b that indicates the target surface 79 and the bucket 8, and the front view 55c that indicates the line 78d indicating a wall surface of a groove to be excavated with the bucket 8 and the icon 89 indicating the bucket 8 in a front view. When the top view 55a and the front view 55c are simultaneously displayed, a scale of the front view 55c can be increased by decreasing a scale of the top view 55a. Accordingly, the operator can recognize the detail of the depth of the groove with the front view 55c while adjusting the positions of the groove and the excavation edge portion P3 with the top view 55a. Also, the processor 44 simultaneously displays, along with the icon 89, a triangle symbol 89M that indicates a center of the bucket 8 in the width direction. The processor 44 display, in the front view 55c, the virtual images Br and Bl that indicate the positions of the planes parallel to the Ya-Za plane and passing through the both ends of the excavation edge portion P3. The processor 44 can calculate the positions of the planes parallel to the Ya-Za plane and passing through the both ends of the excavation edge portion P3 by obtaining the vehicle body coordinate system COM determined in accordance with a posture (tilt) of the vehicle body 1 and the width size of the bucket 8, that is, information of the length of the excavation edge portion P3 from the storage unit 43. Accordingly, the virtual images Br and Bl that indicate the positions of the surfaces parallel to the Ya-Za plane and passing through the both ends of the excavation edge portion P3 when the bucket 8 is viewed from the vehicle body 1 can be displayed. In this way, the virtual images Br and Bl indicate the surfaces parallel to the Ya-Za plane and passing through the both ends of the excavation edge portion P3 when the bucket 8 is viewed from the vehicle body 1. Then, the processor 44 displays the virtual images Br and Bl along with the icon 89 that indicates the bucket 8 when the bucket 8 is viewed from the vehicle body 1 in the direction parallel to the Ya axis.

When a target shape of an object to be worked, that is, a target surface of the design surface 45 is a groove, the lines 78d and 78d that indicate wall surfaces of the groove as viewed from a front face appear on a cross section perpendicular to the extending direction of the groove. The processor 44 displays the lines 78d and 78d that indicate the wall surfaces of the groove to be excavated with the bucket 8 along with the virtual images Br and Bl. Therefore, the operator can easily and intuitively grasp a posture of the work machine 2 illustrated in FIGS. 1 and 2. Note that the processor 44 processes step S9 with the front view 55c undisplayed when there is no input of a front view display (no at step S8).

Next, the processor 44 displays the side view 55b (step S9). The side view 55b of the fine excavation screen 55 includes the icon 90 of the bucket 8 in a side view, the line 74 that indicates a cross section of a design surface, and the line 79 that indicates a cross section of a target surface. Further, information that indicates the positional relation between the target surface 70 and the bucket 8 is displayed in the top view 55a and in the side view 55b of the fine excavation screen 54. The side view means viewing from the extending direction of the bucket pin 15 illustrated in FIGS. 1 and 2 (in a central axis direction of the swing of the bucket 8). The display control device 39 of the present embodiment enables the operator to accurately grasp inclination of a portion to be a groove in the future by simultaneously displaying the side view 55b and the top view 55a when the operator carries out works according to the design surface and excavates the groove with the bucket 8.

The line 79 that indicates a cross section of a target surface and the icon 90 of the bucket 8 in a side view are displayed in the side view 55b. The icon 90 may not be displayed in the side view 55b because the inclination of the line 79 that indicates a cross section of a target surface can just be recognized. The display control device 39 may display the top view 55a with the side view 55b undisplayed.

As described above, the display system 28 of the excavating machine is a system that operates the work machine 2 including the bucket 8 that generates excavating force with the excavation edge portion P3 and the vehicle body 1 to which the work machine 2 is attached. The display system 28 of the excavating machine includes a position detection unit 19, the storage unit 43, and the processor 44. The position detection unit 19 detects information related to a current position of the excavator 100 as an excavating machine. The storage unit 43 stores position information of a target surface, which indicates a target shape of an object to be worked, and appearance information of the bucket 8.

The processor 44 obtains a position of the excavation edge portion P3 as viewed from a top face of the excavator 100 based on the information related to the current position of the excavator 100 and the appearance information of the bucket 8, and displays, on the screen 42P of the display device, the virtual images Br and Bl passing through the both ends of the excavation edge portion P3 and parallel to a plane (Ya-Za plane) on which an arm moves. Here, the position of the excavation edge portion P3 is indicated by the line segment 8AL. In doing so, the lines 78d that indicate wall surfaces of a groove and the virtual images Br and Bl are simultaneously displayed, whereby the operator of the excavator 100 can easily adjust the positions of the groove and the excavation edge portion P3 during work of the groove excavation by the excavator 100. As a result, the operator can carry out works while predicting the position of the excavation edge portion P3 by visually recognizing the virtual images Br and Bl, whereby work efficiency becomes improved.

The processor 44 displays the target surface 79 as viewed from a side face of the excavator 100 like the side view 55b. This allows the operator to accurately grasp inclination of a portion to be a groove in the future when the operator carries out works according to the design surface and excavates the groove with the bucket 8. For example, when a pipe is laid in the groove, the operator can accurately adjust inclination of the pipe.

Further, the processor 44 displays, on the screen 42P of the display device, the virtual images Br and Bl passing through the both ends of the excavation edge portion P3 as viewed from a front face of the bucket 8 and parallel to a surface (Ya-Za plane) on which an arm moves, like the front view 55c, based on the information related to the current position of the excavator 100 and the appearance information of the bucket 8. Then, when a target shape of an object to be worked, that is, a target surface of the design surface 45 is a groove, the lines 78d and 78d that indicate the wall surfaces of the groove to be excavated with the bucket 8 are displayed along with the virtual images Br and Bl. Therefore, the operator can easily and intuitively grasp a posture of the work machine 2 illustrated in FIGS. 1 and 2.

In the present embodiment, an example has been described in which the top view 55a is displayed on the above-described fine excavation screen 55. However, the top view 55a can be displayed on the rough excavation screen 53. Note that the processor 44 of the present embodiment has displayed the above-described top view 55a, the side view 55b, and the front view 55c as a top view (a diagram viewed parallel to the Za axis), a side view (a diagram viewed parallel to the Xa axis), and a front view (a diagram viewed parallel to the Ya axis) in the vehicle body coordinate system COM. The processor 44 may display at lease one of the top view 55a, the side view 55b, and the front view 55c as a top view (a diagram viewed parallel to the Z axis), a side view (a diagram viewed parallel to the X axis), and a front view (a diagram viewed parallel to the Y axis) in the global coordinate system.

(Modification)

Figure 22:
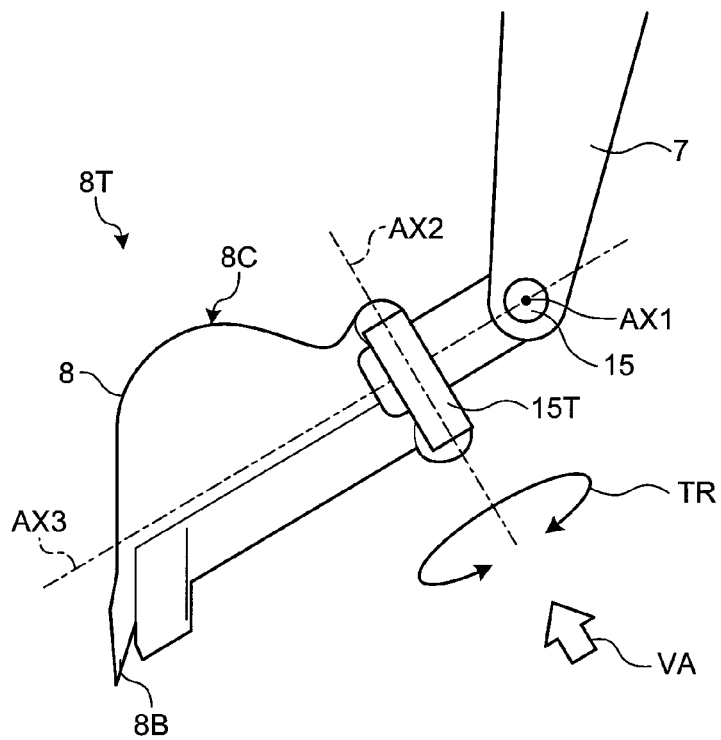
FIG. 22 is a side view of a tilt bucket 8T of an excavator according to a modification.
Figure 23:
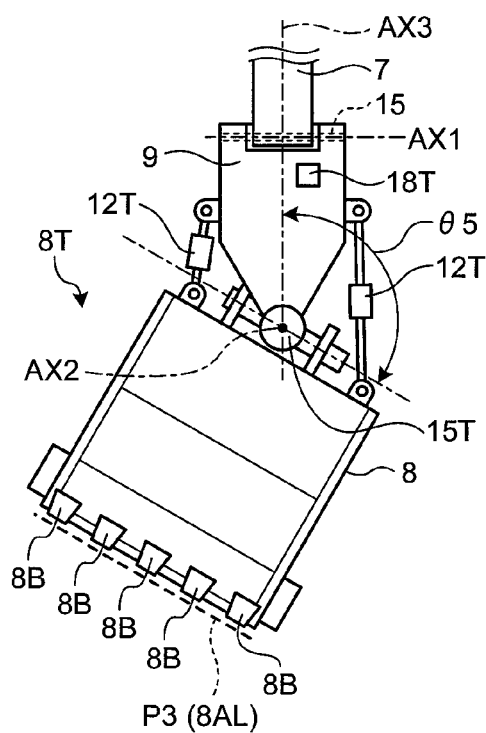
FIG. 23 is a front view of the tilt bucket 8T of the excavator according to the modification.
Figure 24:
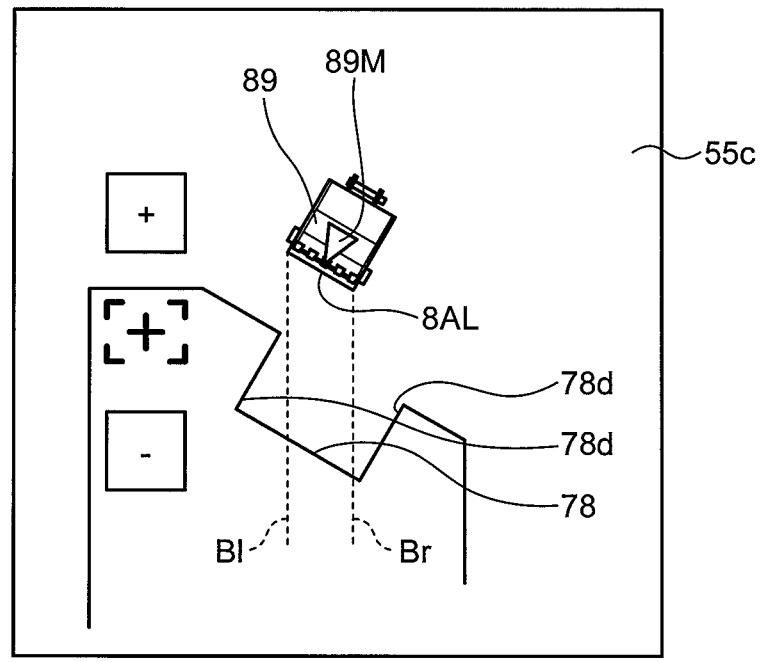
FIG. 24 is a diagram illustrating the tilt bucket 8T of the excavator according to the modification on a screen of a display unit.

The above-described embodiment includes the bucket 8. However, the bucket is not limited to the bucket 8 and may be a tilt bucket. FIG. 22 is a side view of a tilt bucket of an excavator according to a modification. FIG. 23 is a front view of the tilt bucket of the excavator according to the modification. FIG. 23 is a diagram of a tilt bucket 8T viewed in a direction VA parallel to a second axis AX2 that is a central axis in an extending direction of a tilt pin 15T illustrated in FIG. 22. FIG. 24 is a diagram illustrating the tilt bucket of the excavator according to the modification on a screen of a display unit.

The bucket 8T is referred to as a tilt bucket. The tilt bucket is provided with bucket tilt cylinders 12T and 12T, and the bucket is tilted and inclined rightward and leftward, so that the excavator 100 can level and form a slant and a plane in a free way even if the excavator 100 exists on a slope land. The tilt bucket is also capable of performing rolling work with a base plate.

As illustrated in FIGS. 22 and 23, the bucket 8T is coupled to the bucket pin 15 via a coupling member 9. The bucket 8T has the bucket 8 attached to the coupling member 9 via the tilt pin 15T at a side opposite to the bucket pin 15. In this way, the bucket 8T has the bucket 8 attached to the coupling member 9 via the tilt pin 15T so as to swing around the tilt pin 15T. With such a structure, the bucket 8T allows the bucket 8 to swing around the bucket pin 15 and to swing around the tilt pin 15T.

An central axis in the extending direction of the bucket pin 15 is a first axis AX1, and a central axis in the extending direction of the tilt pin 15T is a second axis AX2 perpendicular to a plane that include the first axis AX1. Therefore, the bucket 8T swings around the first axis AX1 and swings around the second axis AX2, so that the excavation edge portion P3 that is a tip of the blade 8B is inclined by inclination angle $\theta 5$ with respect to a third axis AX3 perpendicular to the first axis AX1 and the second axis AX2. For example, a fourth stroke sensor 18T similar to the third stroke sensor 18 is attached to the coupling member 9. Then, a work machine condition detection unit 19 described above includes the fourth stroke sensor 18T similar to the third stroke sensor 18, detects the stroke length of the bucket tilt cylinders 12T and 12T, and transmits a detected value to the display control device 39. Accordingly, the display control device 39 calculates the inclination angle $\theta 5$ of the excavation edge portion P3 with respect to the third axis AX3 from the stroke length of the bucket cylinder 12T detected by the fourth stroke sensor 18T. Then, the storage unit 43 can store the coordinate (xat, yat, zat) of the excavation edge portion P3 of the bucket 8 in the vehicle body coordinate system COM and the inclination angle $\theta 5$ of the excavation edge portion P3 as information of the position of the excavation edge portion P3.

In the modification, the processor 44 displays, as illustrated in FIG. 24, the front view 55c that indicates the icon 89 indicating the bucket 8 in a front view. The icon 89 simultaneously displays the triangle symbol 89M that indicates the center of the bucket 8 in the width direction. The processor 44 displays, in the front view 55c, the virtual images Br and Bl that indicate positions of planes parallel to the Ya-Za plane and passing through both ends of the excavation edge portion P3. The processor 44 displays the icon 89 so as to be inclined as illustrated in FIG. 24 along $\theta 5$ that serves as a tilt inclination angle of the bucket 8 illustrated in FIG. 23. Therefore, the operator can easily and intuitively grasp the tilt inclination angle $\theta 5$ illustrated in FIG. 23 by simultaneously displaying the triangle symbol 89M in the icon 89 of the bucket 8 and the virtual images Br and Bl.

There is a case where the icon 89 is displayed to be inclined even if the excavator 100 is not provided with the tilt bucket 8T unlike the modification. For example, the processor 44 displays the icon 89 so as to be inclined as illustrated in FIG. 24 along the inclination angle $\theta 4$ of the vehicle body 1 in the width direction illustrated in FIG. 3. Therefore, the operator can easily and intuitively grasp the inclination angle $\theta 4$ of the vehicle body 1 in the width direction illustrated in FIG. 3 by simultaneously displaying the triangle symbol 89M in the icon 89 of the bucket 8 and the virtual images Br and Bl.

Although the present embodiment has been described, the present embodiment is not limited by the above-described content. Also, the above-described configuration elements include elements that can be easily conceived by a person skilled in the art and substantially equivalent elements. Further, the above-described configuration elements may be properly combined. Further, various types of omission, replacement, or alternation can be made without departing from the scope of the present embodiment.

For example, the content of each guide screen is not limited to the above description and may be properly altered. Also, a part or the all of the functions of the display control device 39 may be performed by a computer arranged outside the excavator 100. Also, a target object to be worked may have a dotted, a linear, or a three-dimensional shape besides the above-described plane. The input unit 41 of the display input device 38 may be configured from an operation member such as a hard key and a switch besides the touch-panel type input unit.

In the above-described embodiment, the work machine 2 includes the boom 6, the arm 7, and the bucket 8. However, the work machine 2 is not limited to the above configuration and may be one that includes at least the bucket 8. Also, in the above-described embodiment, the first stroke sensor 16, the second stroke sensor 17, and the third stroke sensor 18 detect the inclination angles of the boom 6, the arm 7, and the bucket 8. However, the inclination angle detection means is not limited to the above sensors. For example, an angle sensor for detecting the inclination angles of the boom 6, the arm 7, and the bucket 8 may be provided. Also, the work machine 2 of the modification may have an angle sensor in place of the inclination angle detection means of the fourth stroke sensor 18T of the modification.

In the embodiment, it is preferable that the processor is configured to display the target surface as viewed from a side face of the excavating machine on the screen of the display device.

In the embodiment, it is preferable that the processor is configured to obtain the virtual images indicating positions of planes passing through both ends of the excavation edge portion from among planes parallel to a plane on which the arm moves based on the information related to the current position of the excavating machine, the information related to the posture of the body unit, and the appearance information of the bucket, and to display the virtual images on the screen of the display device with the bucket as viewed from a side of the body unit.

In the embodiment, it is preferable that the bucket is a tilt bucket, and the display system further comprises a work machine condition detection unit configured to detect a position of the excavation edge portion, and the processor is configured to obtain the virtual images indicating positions of planes passing through both ends of the excavation edge portion from among planes parallel to a plane on which the arm moves based on the information related to the current position of the excavating machine, the information related to the posture of the body unit, information related a the position of the excavation edge portion, and the appearance information of the bucket, and to display the virtual images on the screen of the display device with the bucket as viewed from the side of the body unit.

In the embodiment, it is preferable that the processor is configured to display, when the target shape of the object to be worked is a groove, the virtual images and a line indicating a wall surface of the groove in a cross section perpendicular to an extending direction of the groove.

In the embodiment, it is preferable that the line indicating the wall surface of the groove is perpendicular to the target surface.

According to the embodiment, an excavating machine comprises the display system of an excavating machine.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display system of an excavating machine, the excavating machine comprising a work machine including a bucket generating an excavating force at an excavation edge portion and an arm to which the bucket is swingably attached, and a body unit to which the work machine is attached, the display system comprising:
    a vehicle condition detection unit configured to detect information related to a current position of the excavating machine and information related to a posture of the body unit;
    a storage unit configured to store position information of a target surface indicating a target shape of an object to be worked and appearance information of the bucket; and
    a processor configured to obtain virtual images indicating positions of planes passing through both ends of the excavation edge portion from among planes parallel to a plane on which the arm moves based on the information related to the current position of the excavating machine, the information related to the posture of the body unit, and the appearance information of the bucket, and to display the virtual images on a screen of a display device with the bucket as viewed from above the excavating machine.

2. The display system of an excavating machine according to claim 1,
    wherein the processor is configured to display the target surface as viewed from a side face of the excavating machine on the screen of the display device.

3. The display system of an excavating machine according to claim 1,
    wherein the processor is configured to obtain the virtual images indicating positions of planes passing through both ends of the excavation edge portion from among planes parallel to a plane on which the arm moves based on the information related to the current position of the excavating machine, the information related to the posture of the body unit, and the appearance information of the bucket, and to display the virtual images on the screen of the display device with the bucket as viewed from a side of the body unit.

4. The display system of an excavating machine according to claim 1,
    wherein the bucket is a tilt bucket,
    the display system further comprises a work machine condition detection unit configured to detect a position of the excavation edge portion, and
    the processor is configured to obtain the virtual images indicating positions of planes passing through both ends of the excavation edge portion from among planes parallel to a plane on which the arm moves based on the information related to the current position of the excavating machine, the information related to the posture of the body unit, information related a the position of the excavation edge portion, and the appearance information of the bucket, and to display the virtual images on the screen of the display device with the bucket as viewed from the side of the body unit.

5. The display system of an excavating machine according to claim 3,
    wherein the processor is configured to display, when the target shape of the object to be worked is a groove, the virtual images and a line indicating a wall surface of the groove in a cross section perpendicular to an extending direction of the groove.

6. The display system of an excavating machine according to claim 4,
    wherein the processor is configured to display, when the target shape of the object to be worked is a groove, the virtual images and a line indicating a wall surface of the groove in a cross section perpendicular to an extending direction of the groove.

7. The display system of an excavating machine according to claim 5, wherein the line indicating the wall surface of the groove is perpendicular to the target surface.

8. An excavating machine comprising:
a work machine including a bucket generating an excavating force at an excavation edge portion and an arm to which the bucket is swingably attached;
a body unit to which the work machine is attached; and
a display system,
wherein the display system comprises:
a vehicle condition detection unit configured to detect information related to a current position of the excavating machine and information related to a posture of the body unit;
a storage unit configured to store position information of a target surface indicating a target shape of an object to be worked and appearance information of the bucket; and
a processor configured to obtain virtual images indicating positions of planes passing through both ends of the excavation edge portion from among planes parallel to a plane on which the arm moves based on the information related to the current position of the excavating machine, the information related to the posture of the body unit, and the appearance information of the bucket, and to display the virtual images on a screen of a display device with the bucket as viewed from above the excavating machine.

\* \* \* \* \*